US009013713B2

(12) United States Patent
Natsume

(10) Patent No.: US 9,013,713 B2
(45) Date of Patent: Apr. 21, 2015

(54) RELIEF PATTERN DETECTION DEVICE

(75) Inventor: Yoshio Natsume, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 420 days.

(21) Appl. No.: 13/500,493

(22) PCT Filed: Sep. 24, 2010

(86) PCT No.: PCT/JP2010/066555
§ 371 (c)(1),
(2), (4) Date: Apr. 30, 2012

(87) PCT Pub. No.: WO2011/043201
PCT Pub. Date: Apr. 14, 2011

(65) Prior Publication Data
US 2012/0206734 A1 Aug. 16, 2012

(30) Foreign Application Priority Data
Oct. 8, 2009 (JP) ................................ P2009-234414

(51) Int. Cl.
G01B 11/24 (2006.01)
G01B 11/30 (2006.01)
G01B 9/00 (2006.01)
G06K 9/00 (2006.01)

(52) U.S. Cl.
CPC ...................................... G06K 9/0004 (2013.01)

(58) Field of Classification Search
CPC ............ G06K 29/20; G06K 7/10; G06T 1/00; A61B 5/117; G01B 11/24; G02B 6/04
See application file for complete search history.

(56) References Cited

U.S. PATENT DOCUMENTS

| 4,032,889 A * | 6/1977 | Nassimbene ................. 382/115 |
| 4,785,171 A | 11/1988 | Dowling, Jr. et al. |
| 4,932,776 A | 6/1990 | Dowling, Jr. et al. |
| 5,528,355 A * | 6/1996 | Maase et al. .................... 356/71 |
| 7,420,661 B2 * | 9/2008 | Iseri et al. ........................ 356/71 |

FOREIGN PATENT DOCUMENTS

| JP | 62-212892 | 9/1987 |
| JP | 6-300930 | 10/1994 |
| JP | 7-171137 | 7/1995 |
| JP | 2003-85537 | 3/2003 |
| JP | 3461591 | 8/2003 |
| JP | 2004-309377 | 11/2004 |
| JP | 2007-13446 | 1/2007 |

* cited by examiner

Primary Examiner — Kara E Geisel
Assistant Examiner — Hina F Ayub
(74) Attorney, Agent, or Firm — Drinker Biddle & Reath LLP

(57) ABSTRACT

The present invention aims to provide a highly reliable relief pattern detection device 1, including a slant FOP 3 having an input end surface 4 with which an object surface makes contact and an output end surface 5 substantially parallel to the input end surface 4, an irradiation light source 10 disposed on the output end surface 5 side of the slant FOP 3, for irradiating the output end surface 5 with light, and a CCD camera 11 disposed on the output end surface 5 side of the slant FOP 3, for detecting a relief pattern based on light emitted from the output end surface 5, in which optical axes Rf of optical fibers are inclined so as to create a first angle α less than 90° in one direction from the output end surface 5 within a predetermined plane substantially perpendicular to the output end surface 5, the irradiation light source 10 irradiates the output end surface 5 with light in a direction to create a second angle β less than 90° in the other direction from the output end surface 5 within the predetermined plane, and the first angle α and the second angle β are set so that light made incident from the output end surface 5 into a core 8 of the optical fiber 6 enters into a cladding 9.

4 Claims, 29 Drawing Sheets (a)

(b)

(c)

RELIEF PATTERN DETECTION DEVICE

TECHNICAL FIELD

The present invention relates to a relief pattern detection device.

BACKGROUND ART

Conventionally, as devices for detecting relief patterns on the surfaces of objects, ones using prisms are known (refer to, for example, Patent Documents 1 and 2). A fingerprint pattern input device described in Patent Document 1 includes a triangular prism having at its upper surface a finger contact surface with which a finger is brought into contact, a light source disposed obliquely below the prism, for irradiating light toward the finger contact surface of the prism, and a camera for detecting a fingerprint image from reflected light reflected on the finger contact surface of the prism.

However, in the fingerprint pattern input device described above, because the finger contact surface of the prism is obliquely irradiated with light and reflected light thereof is also emitted in an oblique direction of the finger contact surface, a detected fingerprint image is of a fingerprint viewed obliquely, and there has been a problem that the image is distorted as compared to when viewed from the front. Therefore, devices using fiber optic plates in place of prisms in order to solve such problems are known (refer to, for example, Patent Documents 3 to 7).

A fingerprint detection device described in Patent Document 3 includes a fiber optic plate having an input end surface on which a finger is placed and an output end surface parallel to the input end surface, a light source disposed on the input end surface side, for irradiating light toward a finger, and a CCD camera disposed on the output end surface side, for imaging a fingerprint from light transmitted through the finger. In the fingerprint detection device, an image of a fingerprint viewed from the front can be obtained by imaging a fingerprint using light transmitted through a finger.

CITATION LIST

Patent Literature

Patent Document 1: Japanese Patent Application Laid-Open No. S62-212892
Patent Document 2: Japanese Patent Application Laid-Open No. S55-13446
Patent Document 3: Japanese Patent No. 3461591
Patent Document 4: Japanese Patent Application Laid-Open No. H07-171137
Patent Document 5: U.S. Pat. No. 4,932,776
Patent Document 6: U.S. Pat. No. 4,785,171
Patent Document 7: Japanese Patent Application Laid-Open No. H06-300930

SUMMARY OF INVENTION

Technical Problem

However, in the fingerprint detection device of Patent Document 3 described above, when this is used for detection of a relief pattern on the surface of a thick object such as a hand palmprint, the image contrast decreases according to the object thickness because light needs to be transmitted through the object. Therefore, detection results may be subject to variation caused by the influence of object thickness, and the reliability of relief pattern detection may be reduced accordingly.

Therefore, the present invention has been made in view of the problems described above, and it is an object to provide a highly reliable relief pattern detection device.

Solution of Problem

The present invention is a relief pattern detection device for detecting a relief pattern on an object surface including a fiber optic plate having a first surface which is formed of first end faces of a plurality of optical fibers and with which the object surface is brought into contact and a second surface which is formed of second end faces of the optical fibers and is substantially parallel to the first surface, an irradiating means disposed on the second surface side of the fiber optic plate, for irradiating the second surface with light, and a relief pattern detecting means disposed on the second surface side of the fiber optic plate, for detecting the relief pattern based on light emitted from the second surface, in which optical axes of the optical fibers are inclined so as to create a first angle less than 90° in one direction from the second surface within a predetermined plane substantially perpendicular to the second surface, the irradiating means irradiates the second surface with light in a direction to create a second angle less than 90° in the other direction from the second surface within the predetermined plane, and the first angle and the second angle are set so that light made incident from the second surface into a core of the optical fiber enters into a cladding of the optical fiber.

In the relief pattern detection device according to the present invention, when the irradiating means irradiates the second surface with light, the light is propagated from the second surface toward the first surface, the light is scattered or absorbed at projections on the object surface that are in contact with the first surface, and the light is reflected by the first surface at recesses that are out of contact with the first surface. Accordingly, a relief pattern on the object surface is expressed as the brightness and darkness of reflected light, so that the relief pattern can be detected as an image. Therefore, according to the relief pattern detection device, light does not need to be transmitted through the object, so that a decrease in image contrast under the influence of the thickness of the object can be avoided. An image with sufficient contrast can thereby be obtained, so that the reliability of relief pattern detection can be improved.

In the relief pattern detection device according to the present invention, it is preferable that the first angle is an angle within a range of 63° to 73°, and the second angle is an angle within 5° to 30°.

In the relief pattern detection device according to the present invention, it is preferable that, on the second surface of the fiber optic plate, a reinforcing member that transmits the light of the irradiating means is provided. In this case, because the fiber optic plate can be reinforced by the reinforcing member, the life of the device can be extended. Furthermore, by disposing on the second surface side of the fiber optic plate the reinforcing member that transmits light of the irradiating means and reflected light, the influence on the accuracy of relief pattern detection can be suppressed to the minimum. Moreover, an improvement in durability can be realized with a simple structure, which is thus advantageous in reducing the cost of the device.

In the relief pattern detection device according to the present invention, it is preferable that the first surface of the fiber optic plate has a first curved surface to show a projecting shape when viewed in a direction substantially parallel to the predetermined plane. By forming the first curved surface along the object surface, for example, a palm, the object surface can be easily brought into close contact with the first surface at the time of relief pattern detection, so that the accuracy of detection can be improved.

In the relief pattern detection device according to the present invention, it is preferable that the first surface of the fiber optic plate has a second curved surface to show a recessed shape when viewed in a direction substantially parallel to the predetermined plane. By forming the first curved surface along the object surface, for example, the surface of a finger, the object surface can be easily brought into close contact with the first surface at the time of relief pattern detection, so that the accuracy of detection can be improved.

Advantageous Effects of Invention

According to the present invention, a highly reliable relief pattern detection device can be provided.

BRIEF DESCRIPTION OF DRAWINGS

FIG. 5 FIG. 5(a) is a side view showing a measurement status of an image detectable range. FIG. 5(b) is a front view showing a measurement status of an image detectable range. FIG. 5(c) is a bottom view showing a measurement status of an image detectable range.

DESCRIPTION OF EMBODIMENTS

Figure 1:
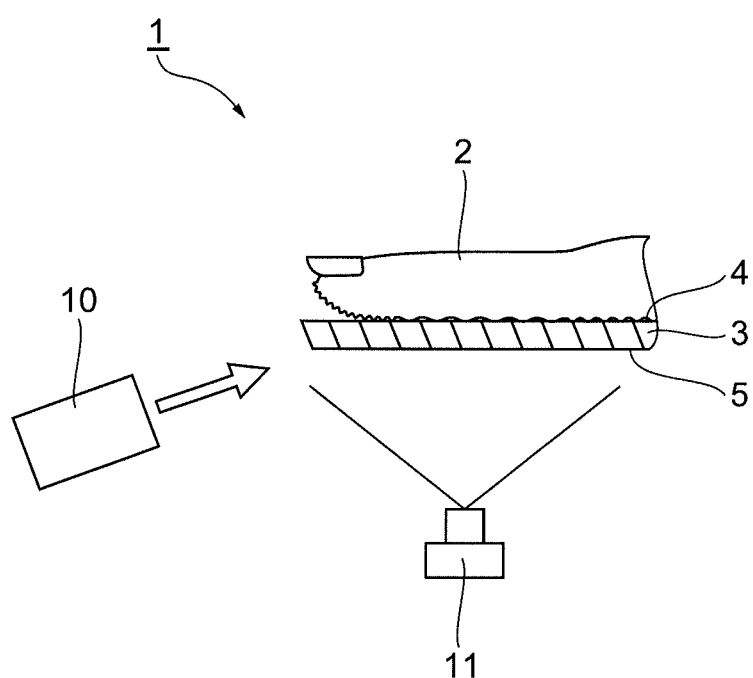
FIG. 1 A schematic side view showing a first embodiment of a relief pattern detection device by the present invention, FIG. 2 An enlarged sectional view showing a slant FOP of FIG. 1.

Hereinafter, preferred embodiments of, the present invention will be described in detail with reference to the drawings. Also, the same or corresponding parts will be denoted with the same reference signs in the drawings, and overlapping description will be omitted.

First Embodiment

Figure 2:
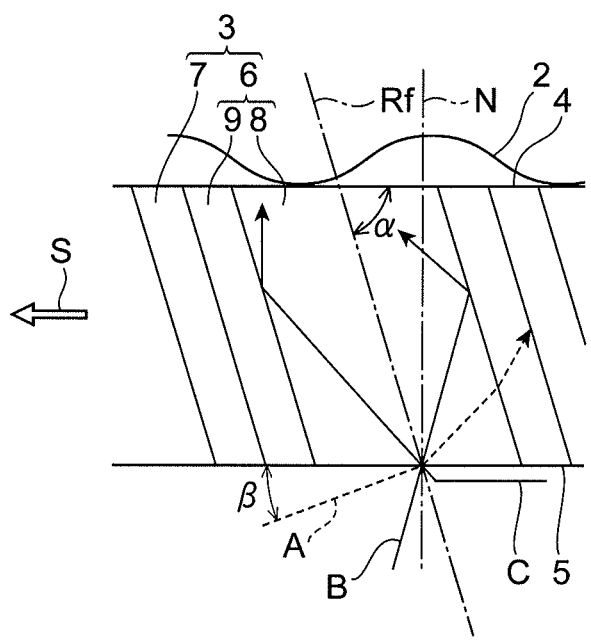

As shown in FIG. 1 and FIG. 2, a relief pattern detection device 1 according to the present embodiment is for detecting a fingerprint that is a relief pattern on the surface of a finger, and includes a slant fiber optic plate (hereinafter, referred to as a slant FOP) 3 having at its upper surface an input end surface (first surface) 4 which makes contact with a finger 2.

The slant FOP 3 is a type of so-called fiber optic plate (Fiber Optic Plate, FOP) for which a plurality of bundled and united optical fibers 6 are formed into a plate shape. The fiber optic plate is an optical element for which, for example, several tens of millions of several-micrometer-diameter single fibers are bundled and fusion-bonded (for example, by heating and pressing). The single fiber is generally formed of three types of glass of a core glass that transmits light, a cladding glass that covers the core glass, and an absorber (E.M.A.) glass that absorbs light leaked from the core glass. The single fiber transmits light as a result of total reflection caused at a boundary between the core glass and cladding glass due to a difference in refractive index therebetween. Light made incident at an angle of the maximum light receiving angle or more is released outside the fiber without causing total reflection, but is absorbed by the absorber glass disposed around the cladding glass. An optical image can therefore be transmitted without a reduction in resolution.

The slant FOP 3 is formed of a plurality of optical fibers 6 and an absorber 7 for absorbing light leaked from the optical fiber 6, disposed between the optical fibers 6. Moreover, the optical fiber 6 is formed of a core 8 and a cladding 9 surrounding the core 8.

The slant FOP 3 has an input end surface 4 formed of upper end faces (first end faces) of the optical fibers 6 and an output end surface (second surface) 5 formed of lower end faces (second end faces) of the optical fibers 6. The slant FOP 3 is formed so as to have a constant thickness, and the input end surface 4 and the output end surface 5 are parallel to each other.

Moreover, the slant FOP 3 is formed so that, in a predetermined normal plane including an optical axis Rf of the optical fiber 6 and substantially perpendicular to the output end surface 5, an angle created by the optical axis Rf of the optical fiber 6 and the output end surface 5 is a predetermined slant angle $\alpha$ (first angle). The slant angle $\alpha$ is an angle less than 90°. The normal plane corresponds to the planes of sheets of FIG. 1 and FIG. 2.

Here, the direction in which the optical axis Rf of the optical fiber 6 is inclined with respect to the output end surface 5 is shown by the arrow S of FIG. 2. In the following, this direction is referred to as an optical axis inclination direction S. On the input end surface 4 of the slant FOP 3, a finger 2 is placed so that its fingertip is pointed in the optical axis inclination direction S.

On the side of the output end surface 5 of the slant FOP 3, an irradiation light source (irradiating means) 10 for irradiating the output end surface 5 with light and a CCD [Charge-Coupled Device] camera (relief pattern detecting means) 11 for detecting a fingerprint image based on light emitted from the output end surface 5 are disposed.

As the irradiation light source 10, an incandescent lamp, a discharge lamp, an LED [Laser-Emitting Diode], an organic EL [Electro Luminescence] element, a laser, or the like is used. The irradiation light source 10 is disposed, on the side of the output end surface 5 of the slant FOP 3, in the optical axis inclination direction S when viewed from the slant FOP 3. The irradiation light source 10 is disposed so that, in the normal plane, an angle created by the direction in which light is irradiated and the output end surface 5 is a predetermined irradiation angle $\beta$ (second angle). The irradiation angle $\beta$ is an angle less than 90°.

The CCD camera 11 is disposed directly below the slant FOP 3, and images the whole fingerprint of the finger 2 placed on the input end surface 4 from the front. The CCD camera 11 is disposed on a lower side further than the irradiation light source 10.

Next, description will be given of a relationship between the slant angle $\alpha$ of the slant FOP 3 and the irradiation angle $\beta$ of the irradiation light source 10 in the relief pattern detection device 1.

In the relief pattern detection device 1, the slant angle $\alpha$ of the slant FOP 3 and the irradiation angle $\beta$ of the irradiation light source 10 are set so as to satisfy a cladding incident condition that light made incident into the core 8 of the optical fiber 6 from the output end surface 5 enters into the cladding 9 (refer to arrow A of FIG. 2). In the relief pattern detection device 1 with such a setting, light with which the irradiation light source 10 irradiates the output end surface 5 does not serve as a main object of fiber transmission in the optical fiber 6. That is, in the relief pattern detection device 1, light made incident into the core 8 from the output end surface 5 enters into the cladding 9 to be scattered without being totally reflected at an interface between the core 8 and the cladding 9. A part of the scattered light is absorbed in the absorber 7, and a part of light not absorbed in the absorber 7 travels inside the slant FOP 3 to reach the input end surface 4.

Specifically, the cladding incident condition is satisfied, in the slant FOP 3 having a thickness of 1 mm, a fiber size of 6 μm, a numerical aperture of 1, a refractive index of the core 8 of 1.82, and a refractive index of the cladding 9 of 1.495, if the slant angle $\alpha$ is 68° and the irradiation angle $\beta$ is an angle within a range of 24° to 90° from a normal N, and light enters into the cladding 9 to be scattered.

On the other hand, when the slant angle $\alpha$ and the irradiation angle $\beta$ do not satisfy the cladding incident condition, light with which the irradiation light source 10 has irradiated the output end surface 5 serves as a main object of fiber transmission in the optical fiber 6. That is, light made incident by the irradiation light source 10 into the core 8 from the output end surface 5 is totally reflected at the interface between the core 8 and the clad 9 of the optical fiber 6, and travels inside the core 8 to be transmitted to the input end surface 4 (refer to arrow B of FIG. 2).

Specifically, the cladding incident condition is not satisfied, in the slant FOP 3 having a thickness of 1 mm, a fiber size of 6 μm, a numerical aperture of 1, a refractive index of the core 8 of 1.82, and a refractive index of the cladding 9 of 1.495, when the slant angle $\alpha$ is 68° and the irradiation angle $\beta$ is an angle of not less than 0° and not more than 24° from a normal N, and light travels inside the core 8. In addition, the arrow C of FIG. 2 shows that light in a direction parallel to the output end surface 5 irradiated from a side of the slant FOP 3 does not satisfy the cladding incident condition in some cases.

In the relief pattern detection device 1 having the above configuration, when light irradiated by the irradiation light source 10 is made incident from the output end surface 5 to reach the input end surface 4, the light is scattered or absorbed into the finger 2 at projections on the finger surface that are in contact with the input end surface 4, and the light is reflected by the input end surface 4 at recesses that are out of contact with the input end surface 4. Accordingly, a fingerprint being a relief pattern on the finger surface is expressed as the brightness and darkness of reflected light, so that the fingerprint can be detected as an image by the CCD camera 11. Thus, according to the relief pattern detection device 1, light does not need to be transmitted through the finger 2 at the time of fingerprint detection, so that a decrease in image contrast under the influence of the thickness of the finger 2 can be avoided. Furthermore, because the light irradiated by the irradiation light source 10 satisfies the cladding incident condition, the brightness and darkness of reflected light according to the fingerprint relief is clearly expressed, thereby allowing detection of an image with sufficient contrast. Therefore, according to the relief pattern detection device 1, the reliability of relief pattern detection can be improved.

Figure 3:
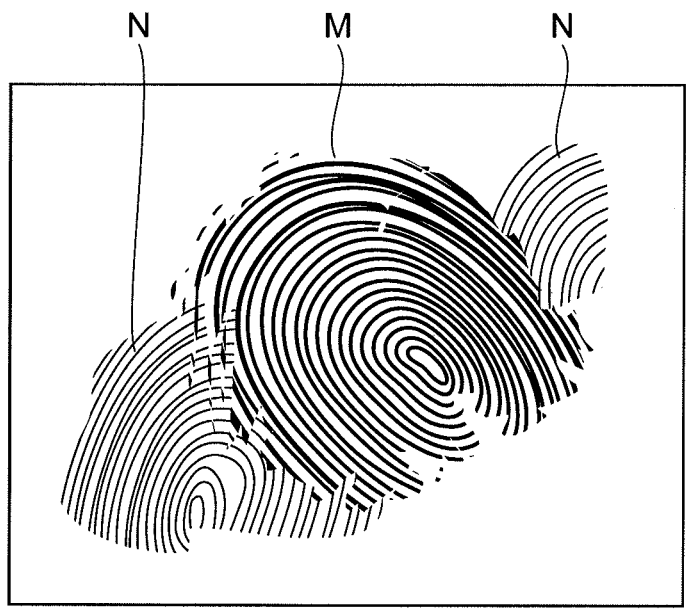
FIG. 3 A view showing fingerprints detected by a conventional prismatic relief pattern detection device.
Figure 4:
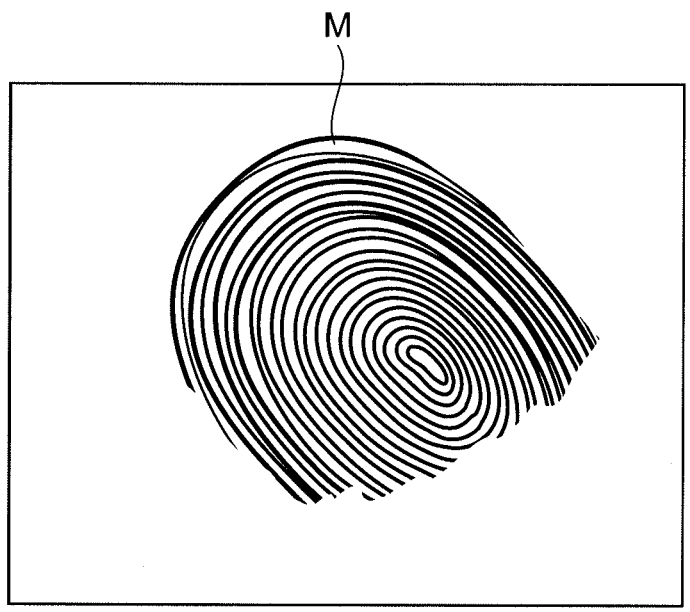
FIG. 4 A view showing a fingerprint detected by the relief pattern detection device of FIG. 1.

Moreover, according to the relief pattern detection device 1, because the slant FOP 3 is used in place of a prism, a reduction in the accuracy of fingerprint detection can be prevented even when there is a smudge such as oil from a finger on the input end surface 4. That is, as shown in FIG. 3, in a method for fingerprinting by pressing a finger against a prism, because of fingerprint detection using a change in a total reflection condition caused by moisture from a finger, remaining fingerprints N are detected besides a fingerprint M of a detection object under the influence of oil from a finger and the like left on the input end surface 4. On the other hand, as shown in FIG. 4, in the relief pattern detection device 1, because the slant FOP 3 is used, there is little influence of a smudge on the input end surface 4, and only a fingerprint M of a detection object can be accurately detected. Moreover, using the slant FOP 3 in place of a prism is advantageous in reducing the size and weight of the device.

Here, the relationship between the slant angle α and the irradiation angle β to satisfy the cladding incident condition will be described based on measurement results. First, description will be given of measurement results of a change in an image detectable range along with a change in the slant angle α and the irradiation angle β. The image detectable range means a range in which a CCD camera can detect an image with sufficient contrast based on light emitted from an output end surface.

First, description will be given of measurement conditions. In this measurement, an FOP manufactured by Hamamatsu Photonics K.K. having a thickness of 1 mm, a fiber diameter of 6 μm, and a numerical aperture of 1 was used as a slant FOP. Moreover, a fiber optic light of LA-150TX manufactured by Hayashi Watch-Works Co., Ltd. was used as an irradiation light source. The fiber optic light has a rated voltage of 100/120V AC, a rated power consumption of 180 W, a rated frequency of 50/60 Hz, and a lamp power consumption of 150 W (15V), As a CCD camera, one having an optic size of ½ inch and 2 million pixels was used. Moreover, as a lens of the CCD camera, one of a CCTV [Closed Circuit Television] C-mount and with an F value of 1.4 and a focal length of 25 mm was used.

As shown in FIG. 5(a) to FIG. 5(c), in this measurement, a standard slant FOP 12 whose slant angle of 68° and a measurement slant FOP 13 having an arbitrary slant angle α are disposed side by side for the purpose of contrast comparison. Similarly, a standard irradiation light source 14 with a fixed irradiation angle of 20° and a measurement irradiation light source 15 with an adjustable irradiation angle β are disposed on the output end surface side of the slant FOPs 12, 13 and in the optical axis inclination direction S when viewed from the slant FOPs 12, 13. In this measurement, the slant angle α of the measurement slant FOP 13 and the irradiation angle β of the measurement irradiation light source 15 were changed, and whether it was within the image detectable range, that is, whether an image with sufficient contrast was detectable was determined visually with reference to an image of reflected light of light of the standard irradiation light source 14 toward the standard slant FOP 12

The standard irradiation light source 14 and the measurement irradiation light source 15 were adjusted so that light to be irradiated approximates parallel light. Specifically, adjustment was performed so that the diameter of irradiation light takes a diameter of 20 mm in direct proximity to the irradiation light source, a diameter of 15 mm at a position 70 mm away from the irradiation light source, and a diameter of 20 mm at a position 100 mm away from the irradiation light source. The standard irradiation light source 14 irradiated a range across a boundary line between the standard slant FOP 12 and the measurement slant FOP 13 with light, and its irradiation center T1 was located on the boundary line. In addition, the distance between the standard irradiation light source 14 and the irradiation center T1 was provided as 80 mm. Similarly, the measurement irradiation light source 15 irradiated a range across a boundary line between the standard slant FOP 12 and the measurement slant FOP 13 with light, and its irradiation center T2 was located on the boundary line. Moreover, the distance between the measurement irradiation light source 15 and the irradiation center T2 was provided as 80 mm.

Next, the range was changed with the irradiation angle β of the measurement irradiation light source 15 fixed at 20°, and the illumination intensity of its irradiation light and reflected light was measured by use of an illuminometer. The measurement results are shown in Table 1. Based on the measurement results, the range was set to 7 with regard to the illumination intensity of the measurement irradiation light source 15 during measurement. Similarly, the range was set to 7 also for the standard irradiation light source 14.

TABLE 1

| RANGE | IRRADI-ATION LIGHT lx | REFLECTED LIGHT lx | REFLECTED LIGHT/ IRRADIATION LIGHT % | DIFFER-ENCE lx |
|---|---|---|---|---|
| 6 | 10000 | 1200 | 0.1200 | 8800 |
| 7 | 31000 | 3800 | 0.1400 | 27200 |
| 8 | 60000 | 8800 | 0.1467 | 51200 |

The image detectable range being a measurement object is expressed schematically as a range extending in a substantially elliptic cone shape having an apex at the irradiation center T2. Here, the image detectable range is expressed by three angles θf, θb, θw having an apex at the irradiation center T2 and having a reference (0°) at the output end surface.

θf is an angle around the irradiation center T2 in a plane (hereinafter, referred to as "a normal plane") including a normal of the output end surface and an optical axis of the measurement irradiation light source 15. θf is an angle until an image with sufficient contrast becomes detectable when the CCD camera (not shown) being an observation point is moved in an arc shape, with the output end surface on the side of the measurement irradiation light source 15 provided as 0°.

Similar to θf, θb is an angle around the irradiation center T2 in the normal plane. θb is an angle until an image with sufficient contrast can no longer be detected when the CCD camera is moved toward the output end surface on the opposite side to the measurement irradiation light source 15. Here, an average angle of θf and θb is expressed as a central angle θc, and a segment that creates the central angle θc with the output end surface is expressed by W.

θw is an angle around the irradiation center T2 in a central angle plane which is a plane including the segment W and vertical to the normal plane. θw is an angle until an image with sufficient contrast becomes detectable when the CCD camera is moved in an arc shape in the central angle plane, with the output end surface provided as 0°. θw takes the same value on the left and right when viewed from the measurement irradiation light source 15.

The image detectable range can be expressed by use of θf, θb, θw described in the above. Specifically, a range of θf to θb in the normal plane and a range of θw to 180-θw in the central angle plane correspond to the image detectable range. In addition, γa is an angular width in the normal plane of the image detectable range, and is expressed as a difference of θf and θb.

Table 2 to Table 4 show relationships between the irradiation angle β of the measurement irradiation light source 15 and the slant angle α of the measurement slant FOP 13 and θf, θb, and θw. Table 2 is a table showing a relationship between the slant angle α and θf, θb, and θw when the irradiation angle β is 10°. Table 3 is a table showing a relationship between the slant angle α and θf, θb, and θw when the irradiation angle β is 20°. Table 4 is a table showing a relationship between the slant angle α and θf, θb, and θw when the irradiation angle β is 30°.

TABLE 2

| SLANT ANGLE α | θf | θb | θc | ANGULAR WIDTH γa | | SLANT ANGLE α | θw |
|---|---|---|---|---|---|---|---|
| IRRADIATION ANGLE 10° | 78 | 50 | 75 | 62.5 | 25 | IRRADIATION ANGLE 10° | 78 | 45 |
| | 73 | 60 | 95 | 77.5 | 35 | | 73 | 45 |
| | 68 | 70 | 105 | 87.5 | 35 | | 68 | 45 |
| | 63 | 85 | 130 | 107.5 | 45 | | 63 | 45 |
| | 58 | 95 | 140 | 117.5 | 45 | | 58 | 45 |

TABLE 3

| SLANT ANGLE α | θf | θb | θc | ANGULAR WIDTH γa | | SLANT ANGLE α | θw |
|---|---|---|---|---|---|---|---|
| IRRADIATION ANGLE 20° | 78 | 50 | 70 | 60.0 | 20 | IRRADIATION ANGLE 20° | 78 | 45 |
| | 73 | 60 | 95 | 77.5 | 35 | | 73 | 45 |
| | 68 | 70 | 105 | 87.5 | 35 | | 68 | 45 |
| | 63 | 90 | 130 | 110.0 | 40 | | 63 | 45 |
| | 58 | 95 | 140 | 117.5 | 45 | | 58 | 45 |

TABLE 4

| SLANT ANGLE α | θf | θb | θc | ANGULAR WIDTH γa | | SLANT ANGLE α | θw |
|---|---|---|---|---|---|---|---|
| IRRADIATION ANGLE 30° | 78 | — | — | — | — | IRRADIATION ANGLE 30° | 78 | — |
| | 73 | — | — | — | — | | 73 | — |
| | 68 | 75 | 100 | 87.5 | 25 | | 68 | 45 |
| | 63 | — | — | — | — | | 63 | — |
| | 58 | — | — | — | — | | 58 | — |

Figure 6:
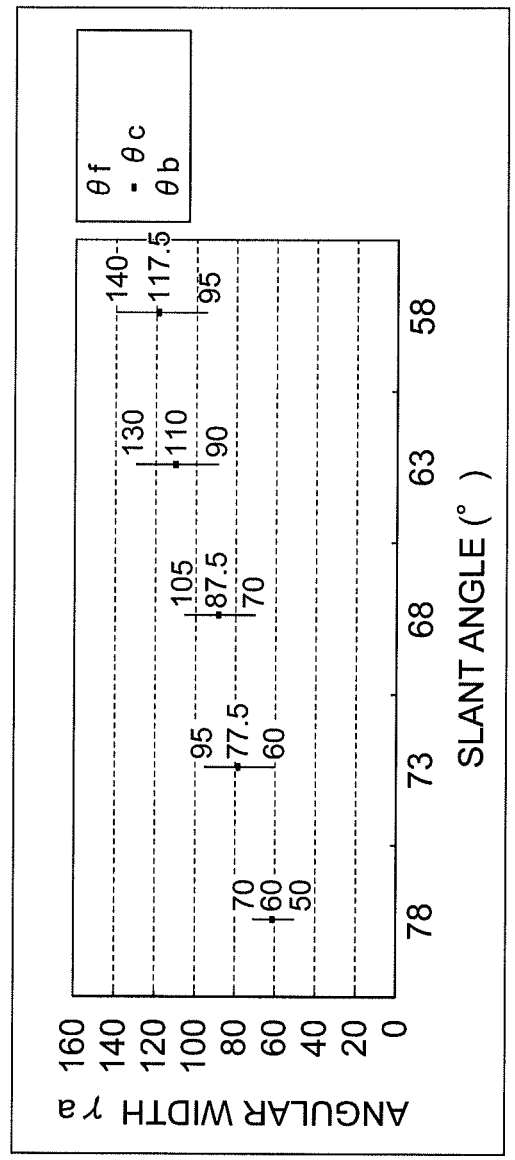
FIG. 6 A graph showing a relationship between the angle of the image detectable range and the slant angle when the irradiation angle is 20°.
Figure 7:
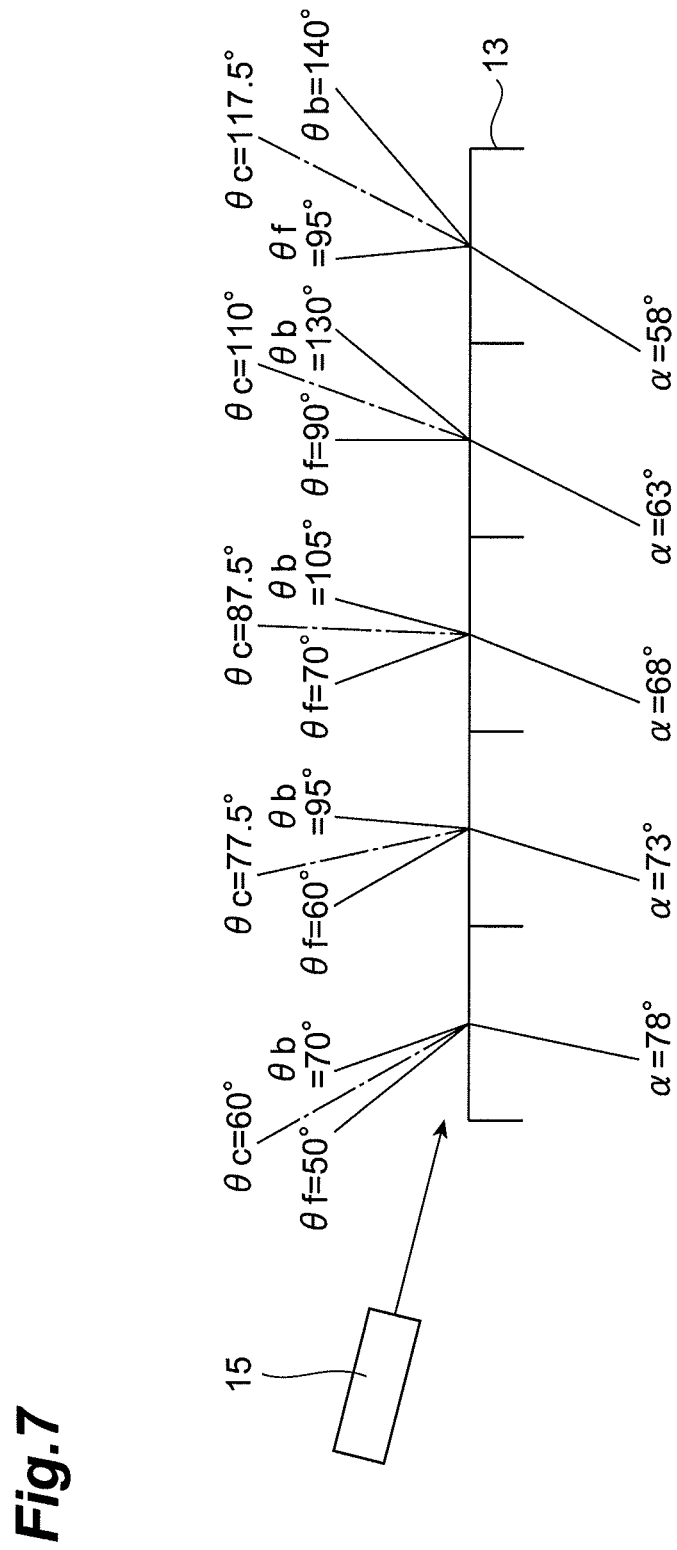
FIG. 7 A view showing a relationship between the angle of the image detectable range and the slant angle when the irradiation angle is 20°.

FIG. 6 is a graph showing the relationship between the slant angle α and θf and θb when the irradiation angle is 20° shown in Table 3, and FIG. 7 is a view showing the relationship between the slant angle α and θf and θb when the irradiation angle is 20°. Moreover, FIG. 8 is a graph showing the relationship between the slant angle α and θf and θb when the irradiation angle is 30° shown in Table 4.

As shown in Tables 2 and 3 and FIGS. 6 and 7, the image detectable range expressed by θf and θb inclined to the irradiation light source side as the slant angle α increased, and the image detectable range inclined to the side opposite to the irradiation light source as the slant angle α decreased. When the irradiation angle was 10° or 20°, the smaller the slant angle α, the larger the angular width γa, that is, the image detectable range.

Figure 8:
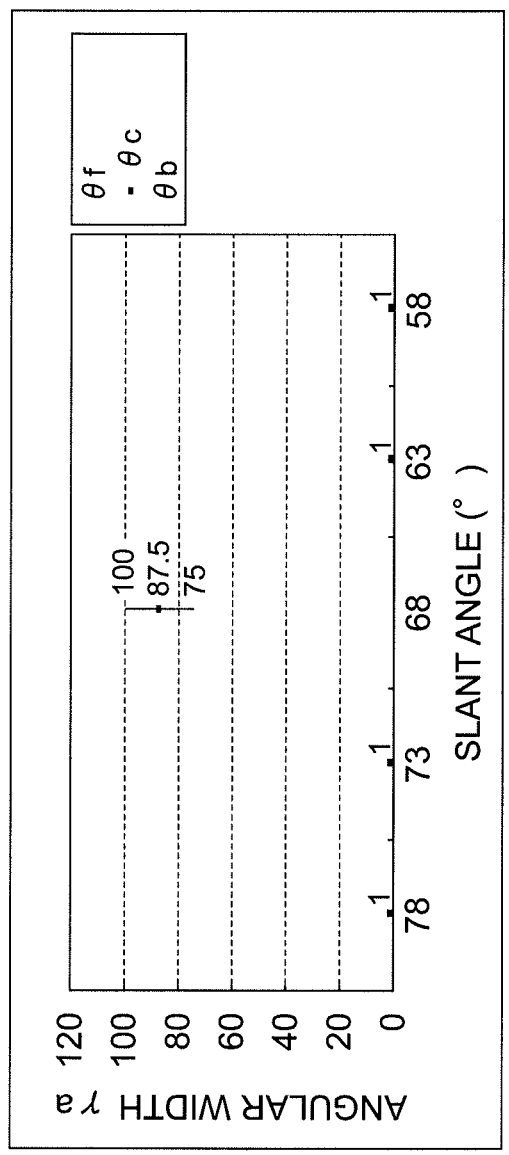
FIG. 8 A graph showing a relationship between the angle of the image detectable range and the slant angle when the irradiation angle is 30°.

Moreover, as shown in Table 4 and FIG. 8, in the case of an irradiation angle β of 30°, a practical image detectable range could be obtained when the slant angle α was 68°. Also, in the case of an irradiation angle β of 30°, when the slant angle α was 68°, the angular width γa existed.

Next, description will be given of measurement results of a change in contrast of the irradiation center T2 along with a change in the slant angle α and the irradiation angle β.

The contrast of the irradiation center T2 shown in FIG. 5(a) to FIG. 5(c) was measured visually by changing the slant angle α and the irradiation angle β. The measurement conditions are different from those for the image detectable range described above mainly in that the CCD camera (not shown) being an observation point was fixed in position, and the range of the irradiation light source was changed for measurement. The CCD camera was fixed to a position directly below a boundary line between the standard slant FOP 12 and the measurement slant FOP 13 and where the irradiation centers T1, T2 could be imaged.

Figure 5:
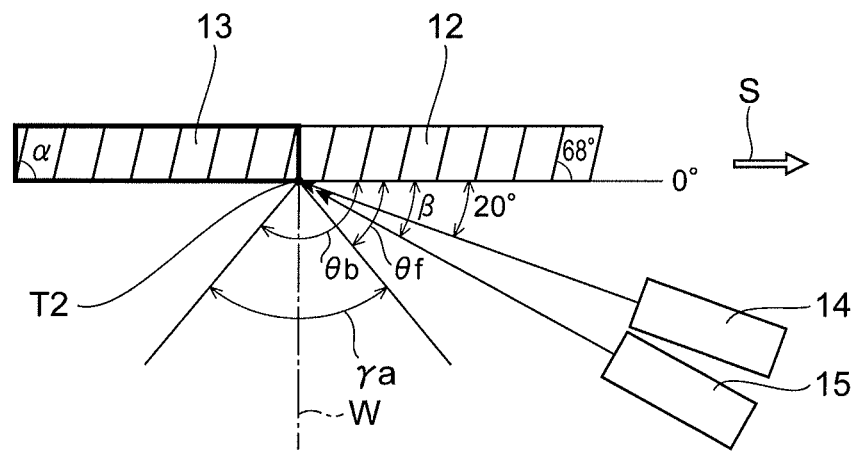
Figure 5:
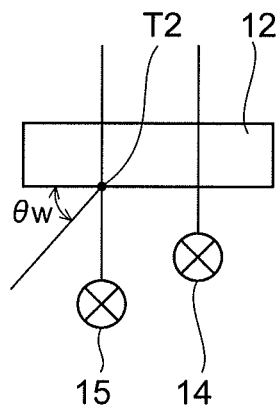
Figure 5:
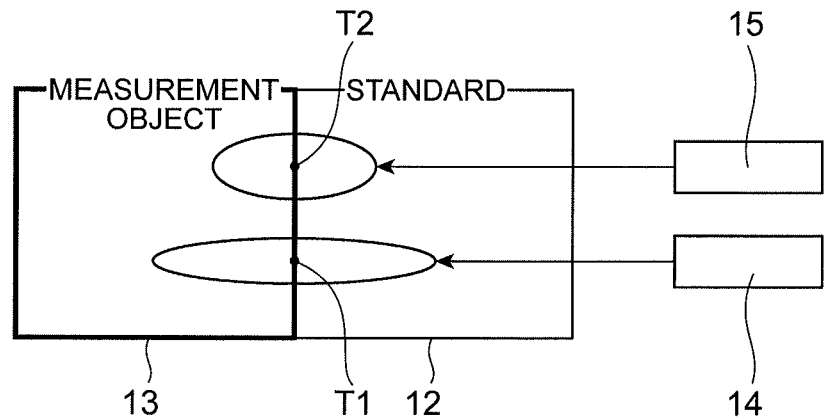

Table 5 is a table showing visual contrast grading. As shown in FIG. 5, the contrast of each image of the irradiation center T2 imaged by the CCD camera was graded at a 5-point scale. Here, the grading was performed by rating the contrast when the slant angle α was 68° and the irradiation angle β was 10° at grade 5. In addition, the image detectable range described above corresponds to a range having a contrast of grade 4 or more in Table 5.

TABLE 5

| GRADE | |
|---|---|
| 5 | HAS STRONG CONTRAST |
| 4 | HAS CONTRAST |
| 3 | HAS SOME CONTRAST |
| 2 | FINGER COLOR BEGINS TO APPEAR TO DEGRADE CONTRAST. |
| 1 | HAS NO CONTRAST. NO FINGERPRINT OBSERVED. |

Figure 9:
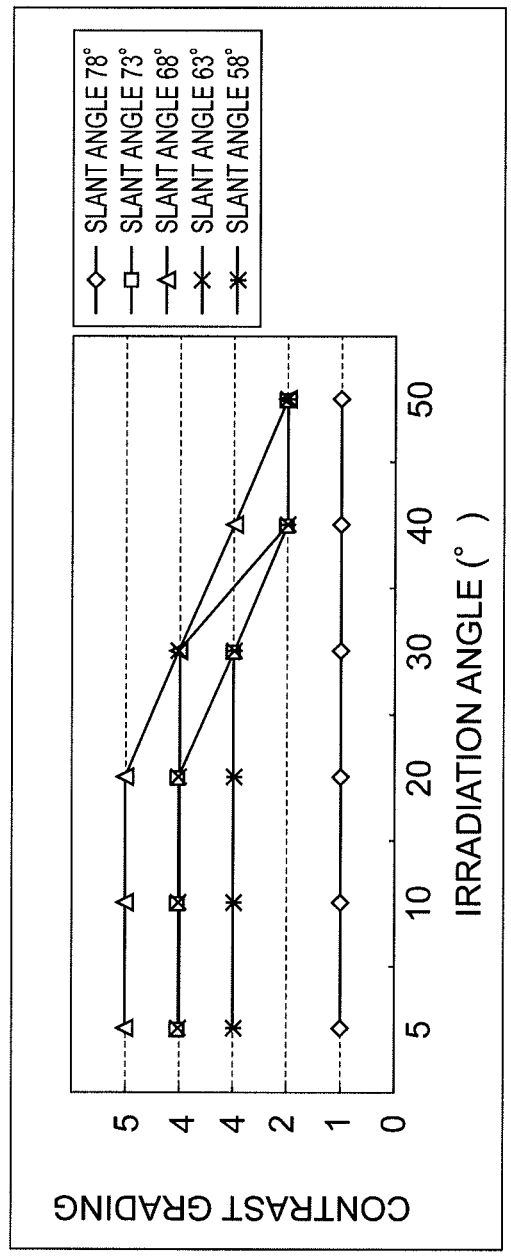
FIG. 9 A graph showing a relationship between the contrast of an irradiation center and the irradiation angle and slant angle.

Table 6 to Table 8 show relationships between the slant angle α and the irradiation angle β and the contrast of the irradiation center T2. Table 6 is a table showing a relationship between the slant angle α and the irradiation angle β and the contrast of the irradiation center T2 when the range of the measurement irradiation light source 15 is 7. Table 7 is a table showing a relationship between the slant angle α and the irradiation angle β and the contrast of the irradiation center T2 when the range of the measurement irradiation light source 15 is 9. Table 8 is a table showing a relationship between the slant angle α and the irradiation angle β and the contrast of the irradiation center T2 when the range of the measurement irradiation light source 15 is 6. In addition, FIG. 9 is a graph showing the relationship between the slant angle α and the irradiation angle β and the contrast of the irradiation center T2 of Table 6.

TABLE 6

| SLANT ANGLE | IRRADIATION ANGLE β | | | | | |
|---|---|---|---|---|---|---|
| | 5° | 10° | 20° | 30° | 40° | 50° |
| 78 | 1 | 1 | 1 | 1 | 1 | 1 |
| 73 | 4 | 4 | 4 | 3 | 2 | 1 |
| 68 | 5 | 5 | 5 | 4 | 3 | 1 |
| 63 | 4 | 4 | 4 | 4 | 2 | 1 |
| 58 | 3 | 3 | 3 | 3 | 2 | 1 |

TABLE 7

| SLANT ANGLE | IRRADIATION ANGLE β | | | | | |
|---|---|---|---|---|---|---|
| | 5° | 10° | 20° | 30° | 40° | 50° |
| 78 | 1 | 1 | 1 | 1 | 1 | 1 |
| 73 | 4 | 4 | 4 | 3 | 2 | 1 |
| 68 | 5 | 5 | 5 | 4 | 3 | 1 |
| 63 | 4 | 4 | 4 | 4 | 2 | 1 |
| 58 | 3 | 3 | 3 | 3 | 2 | 1 |

TABLE 8

| SLANT ANGLE | IRRADIATION ANGLE β | | | | | |
|---|---|---|---|---|---|---|
| | 5° | 10° | 20° | 30° | 40° | 50° |
| 78 | 1 | 1 | 1 | 1 | 1 | 1 |
| 73 | 4 | 4 | 4 | 3 | 2 | 1 |
| 68 | 5 | 5 | 5 | 4 | 3 | 1 |
| 63 | 4 | 4 | 4 | 4 | 2 | 1 |
| 58 | 3 | 3 | 3 | 3 | 2 | 1 |

As shown in Table 6 to Table 8, when the slant angle α of the measurement slant FOP 13 was 63° to 73° and the irradiation angle β of the measurement irradiation light source 15 was 5° to 30°, images with excellent contrast of around grade 4 could be obtained. Particularly, images with remarkable contrast of grade 5 could be obtained when the slant angle α was 68° and the irradiation angle β was 5° to 20°. Moreover, even when the range of the measurement irradiation light source 15 was changed to 6, 7, and 9, there was no change in grading of the contrast of the irradiation center T2.

In addition, when the measurement slant FOP 13 including no absorber 7 was used, there was a tendency that the contrast is slightly insufficient in a state with a background light. Even a measurement slant FOP without the absorber 7 had substantially the same contrast as that of a measurement slant FOP with the absorber 7 in a state without a background light.

Based on the above measurement results, excellent contrasts could be obtained when the slant angle α of the slant FOP was 63° to 73° and the irradiation angle β of the irradiation light source was 5° to 30°. Practically, it is particularly preferable when the slant angle α is 68° and the irradiation angle β is 5° to 30°. The image detectable range in this case is θf of 70°, θb of 105°, and γa of 35°, and has θw of approximately 45°, and is thus suitable for observation from the side. Therefore, when the slant angle α is 68° and the irradiation angle β is 5° to 30°, it is considered satisfactory that the angle created by the observation direction and the output end surface 5 is up to approximately 45°.

Second Embodiment

A relief pattern detection device 21 according to a second embodiment is different from the relief pattern detection device 1 according to the first embodiment in including a reinforcing member.

Figure 10:
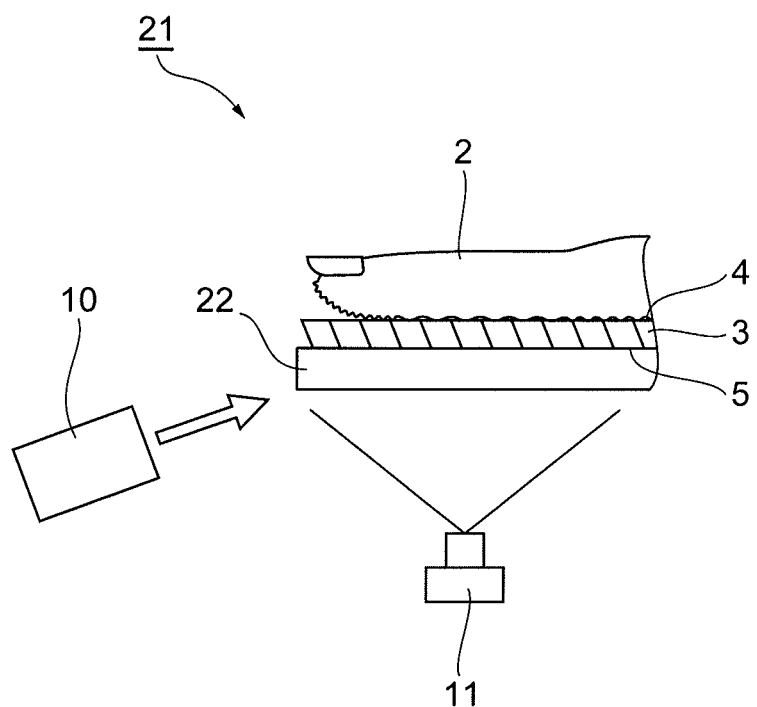
FIG. 10 A schematic side view showing a relief pattern detection device according to a second embodiment.

As shown in FIG. 10, the relief pattern detection device 21 according to the second embodiment includes a thick plate-shaped reinforcing member 22 disposed on the output end surface 5 of the slant FOP 3. The reinforcing member 22 is made of an acrylic resin, glass, or the like, and transmits light of the irradiation light source 10 and reflected light reflected on the input end surface 4 and emitted from the output end surface 5.

In the relief pattern detection device 21 according to the second embodiment thus configured, the device durability can, be improved by reinforcing the slant FOP 3 by the reinforcing member 22. Furthermore, by disposing on the side of the output end surface 5 of the slant FOP 3 the reinforcing member 22 that transmits light of the irradiation light source 10 and reflected light, the influence on the accuracy of fingerprint detection can be suppressed to the minimum. Moreover, an improvement in durability can be realized with a simple structure, which is thus advantageous in reducing the cost of the device, Third Embodiment A relief pattern detection device 31 according to a third embodiment is different from the relief pattern detection device 1 according to the first embodiment in detecting a hand palmprint and the shape of the slant FOP.

As shown in FIG. 11 to FIG. 14, the relief pattern detection device 31 according to the third embodiment is for detecting a palmprint of a left hand 32 of a detection object person, and includes a slant FOP 33 having at its upper surface an input end surface (first surface) 34 which makes contact with the hand 32.

Figure 11:
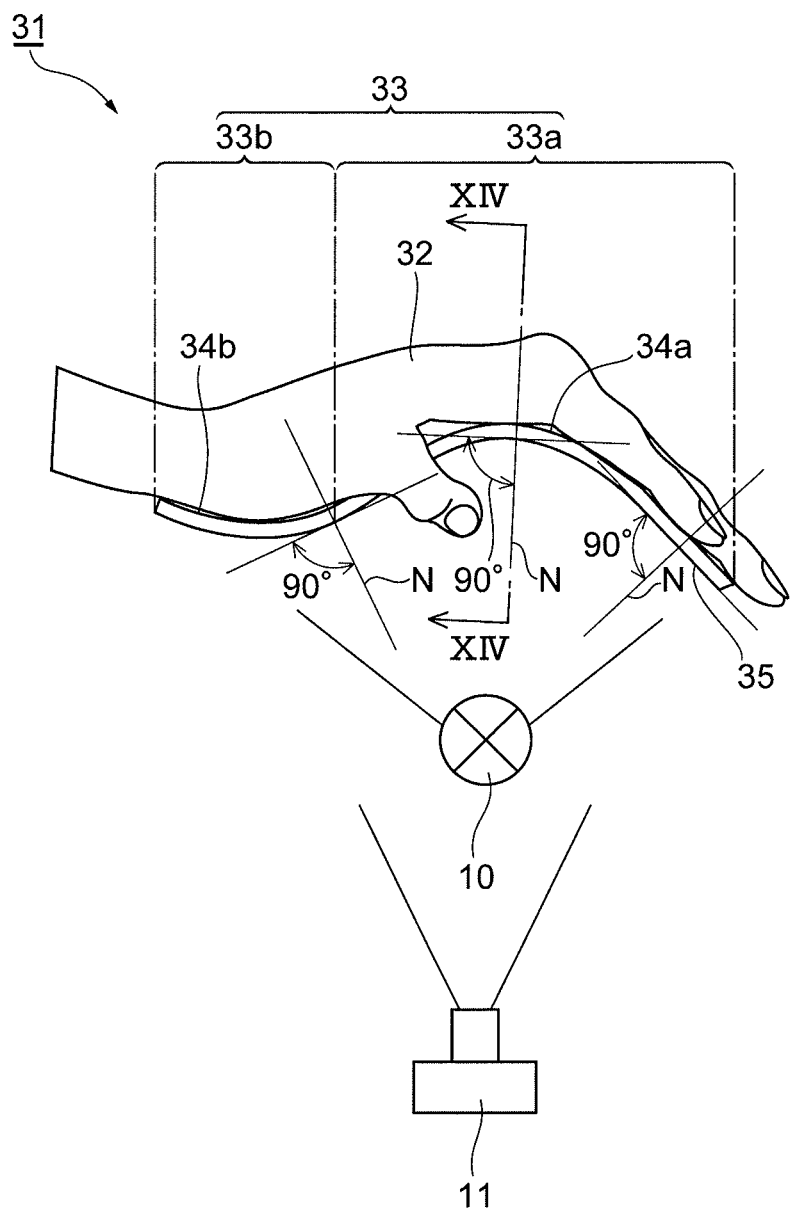
FIG. 11 A schematic side view showing a relief pattern detection device according to a third embodiment.
Figure 12:
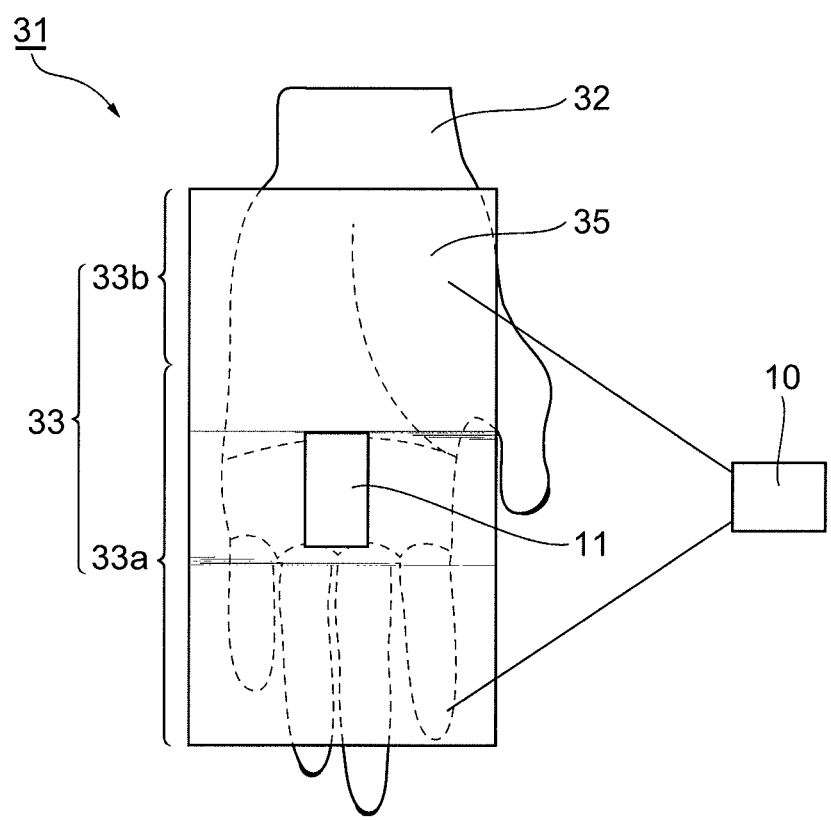
FIG. 12 A schematic bottom view showing the relief pattern detection device of FIG. 11.
Figure 13:
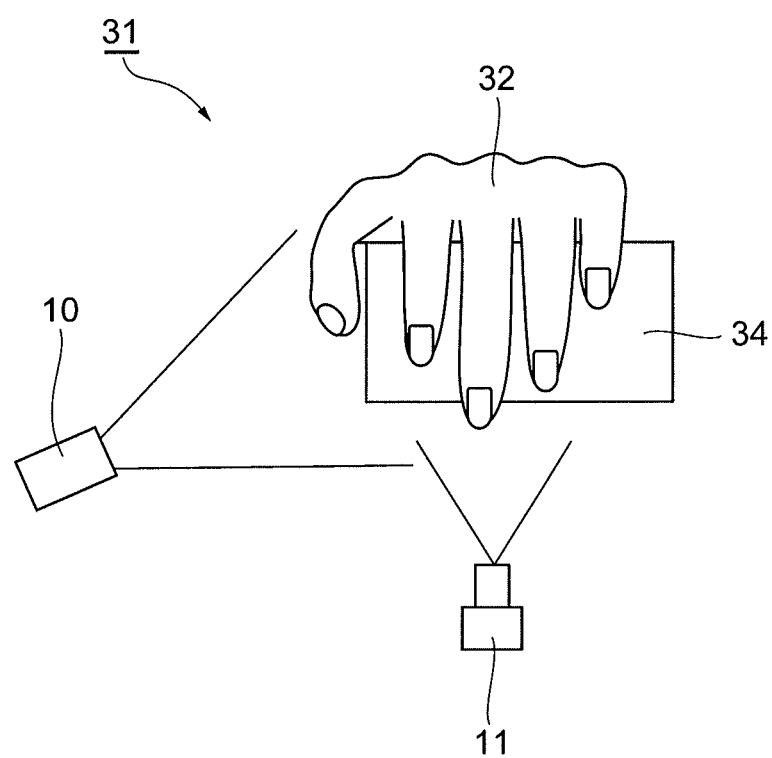
FIG. 13 A schematic front view showing the relief pattern detection device of FIG. 11.
Figure 14:
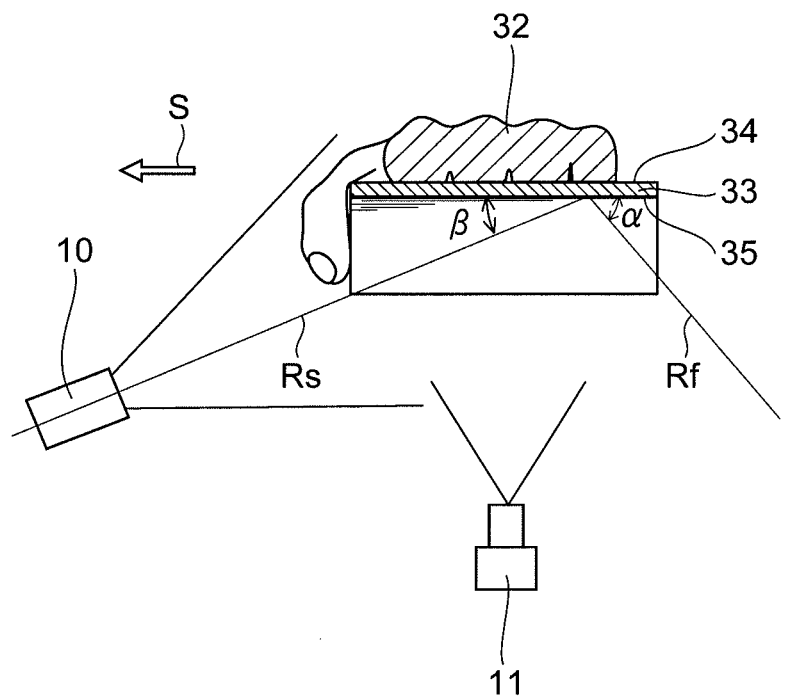
FIG. 14 A sectional view taken along a line XIV-XIV of FIG. 11.

The slant FOP 33 is formed in a tile shape by a front portion 33a curved in a projecting shape and a rear portion 33b curved in a recessed shape. An upper surface (first curved surface) 34a of the front portion 33a, as shown in FIG. 11, shows a projecting curved surface when viewed in a direction parallel to a predetermined normal plane (corresponding to the plane of a sheet of FIG. 14) including the optical axis Rf of the optical fiber 6 and substantially perpendicular to an output end surface 35. The upper surface 34a of the front portion 33a shows a moderately projecting curved surface along the palm.

Similarly, an upper surface 34b of the rear portion 33b shows a recessed curved surface when viewed in the direction parallel to the normal plane. The upper surface 34b of the rear portion 33b shows a recessed curved surface along a wrist portion of the palm. On the slant FOP 33, the hand 32 is placed so that the wrist portion of the palm makes contact with the upper surface 34b of the rear portion 33b and other parts make contact with the upper surface 34a of the front portion 33a. Thus forming the upper surface 34a of the front portion 33a of the slant FOP 33 makes it easy to bring the palm into close contact with the input end surface 34, so that the accuracy of palmprint detection can be improved.

Moreover, the slant FOP 33 is formed so that the optical axes Rf of optical fibers that form the slant FOP 33 are inclined toward a thumb side in a width direction of the hand 32. That is, the optical axis inclination direction S of the slant FOP 33 corresponds to a direction from the pinky side toward the thumb side of the width direction of the hand 32. In addition, as shown in FIG. 11, when the slant FOP 33 is viewed in the optical axis inclination direction S, the optical axis Rf of the optical fiber is coincident with a normal N of the output end surface 35.

The slant FOP 33 is formed at its lower surface with an output end surface (second surface) 35. The slant FOP 33 has a constant thickness, and the input end surface 34 and the output end surface 35 of the slant FOP 33 are formed so as to have a constant interval therebetween.

On the side of the output end surface 35 of the slant FOP 33, an irradiation light source 10 and a CCD camera 11 are provided. The irradiation light source 10 irradiates light toward the palm on the input end surface 34. The irradiation light source 10 is disposed, on a lower side of the front portion 33a of the slant FOP 33, at a position in the optical axis inclination direction S when viewed from the slant FOP 33. Moreover, the irradiation light source 10 is disposed at a position such that irradiated light is made incident into the output end surface 35 in a direction where the irradiated light does not serve as a main object of fiber transmission in the slant FOP 33.

Figure 15:
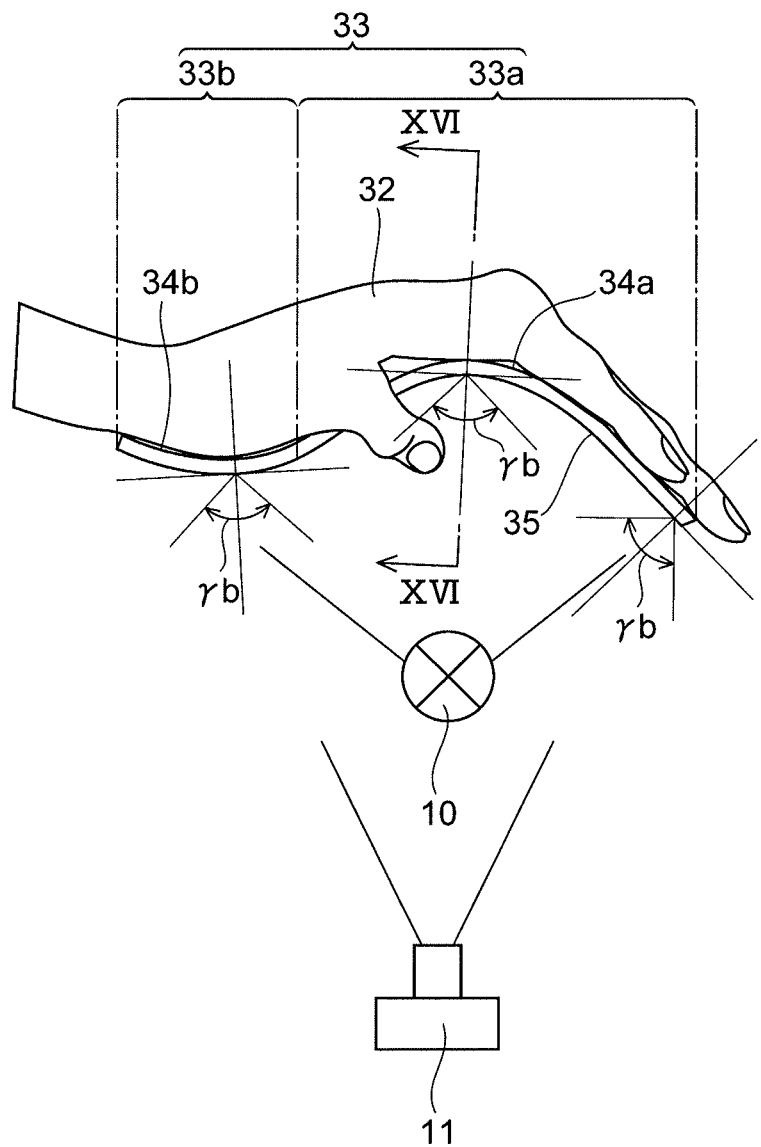
FIG. 15 A schematic side view for explaining an image detectable range in the relief pattern detection device of FIG. 11.
Figure 16:
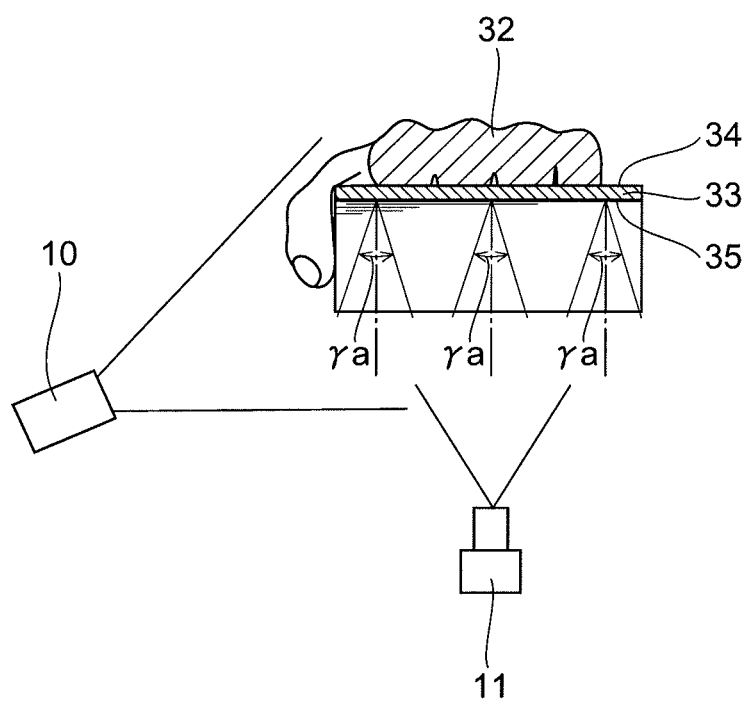
FIG. 16 A sectional view for explaining an image detectable range in the relief pattern detection device of FIG. 11.
Figure 17:
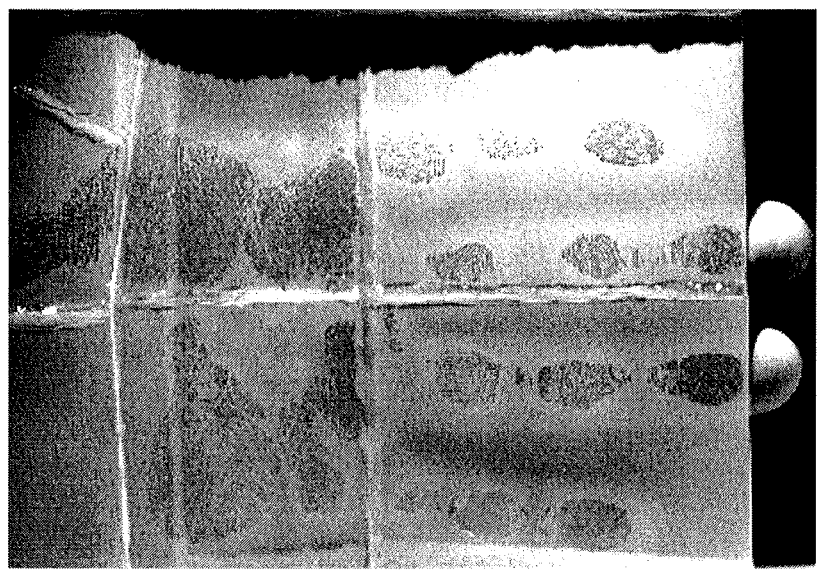
FIG. 17 A photo of a palmprint detected by the relief pattern detection device of FIG. 11.

The CCD camera 11 is disposed directly below the front portion 33a of the slant FOP 33 and within an image detectable range in which the CCD 11 camera can detect the palmprint of the hand 32 as an image with sufficient contrast. FIGS. 15 and 16 show angular widths γa, γb of image detectable ranges. Here, γb is the angular width of an image detectable range in a central angle plane, and its value is equal to 180° from which a value of two times θw has been subtracted. The CCD camera 11 images the whole palm of the hand 32 placed on the input end surface 34 from the front.

In the relief pattern detection device 31 thus configured, the same effects as those of the relief pattern detection device 1 according to the first embodiment can be obtained. Particularly, light does not need to be transmitted through the hand 32 at the time of palm detection, so that a decrease in image contrast under the influence of the thickness of the hand 32 that varies more from person to person than a finger can be avoided to obtain an image with substantially uniform illumination. Furthermore, using the slant FOP 33 in place of a prism makes it easy to increase the input end surface 34 in area, and forming the slant FOP 33 in a tile shape allows a redaction in the size of the device while sufficiently securing the area of the input end surface 34.

Moreover, the relief pattern detection device 31 having such a configuration can be suitably used also for collectively detecting fingerprints of four fingers, besides palmprint detection.

Fourth Embodiment

A relief pattern detection device 41 according to a fourth embodiment is different from the relief pattern detection device 31 according to the third embodiment in including a reinforcing member.

Figure 18:
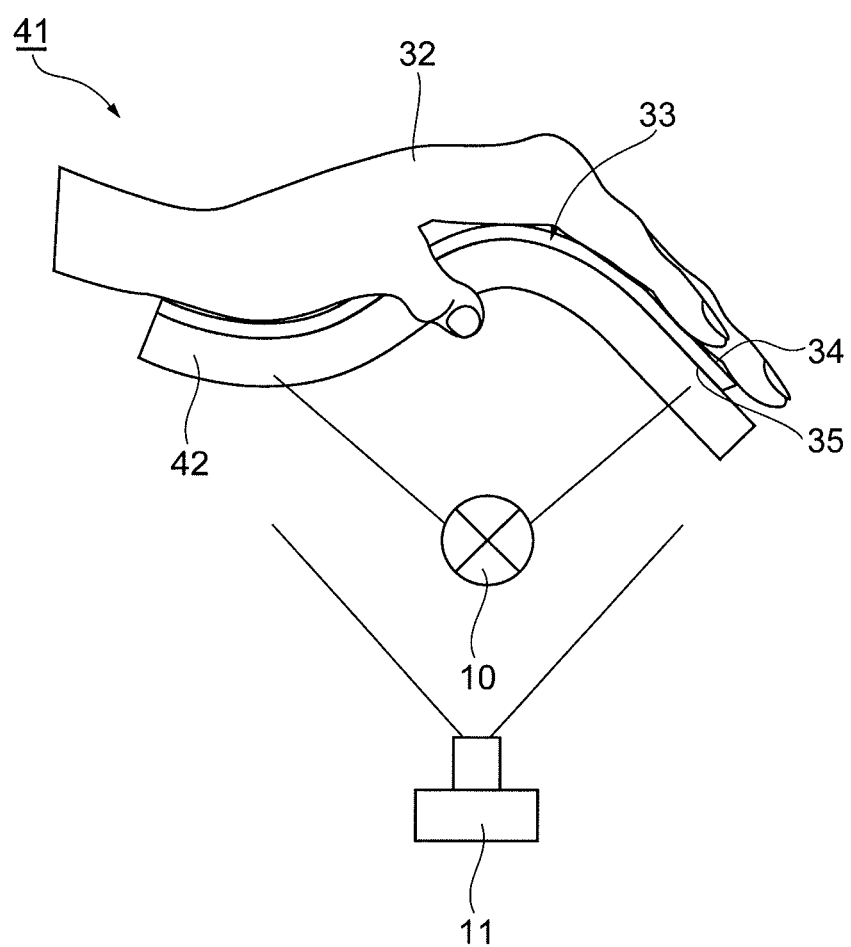
FIG. 18 A schematic side view showing a relief pattern detection device according to a fourth embodiment.
Figure 19:
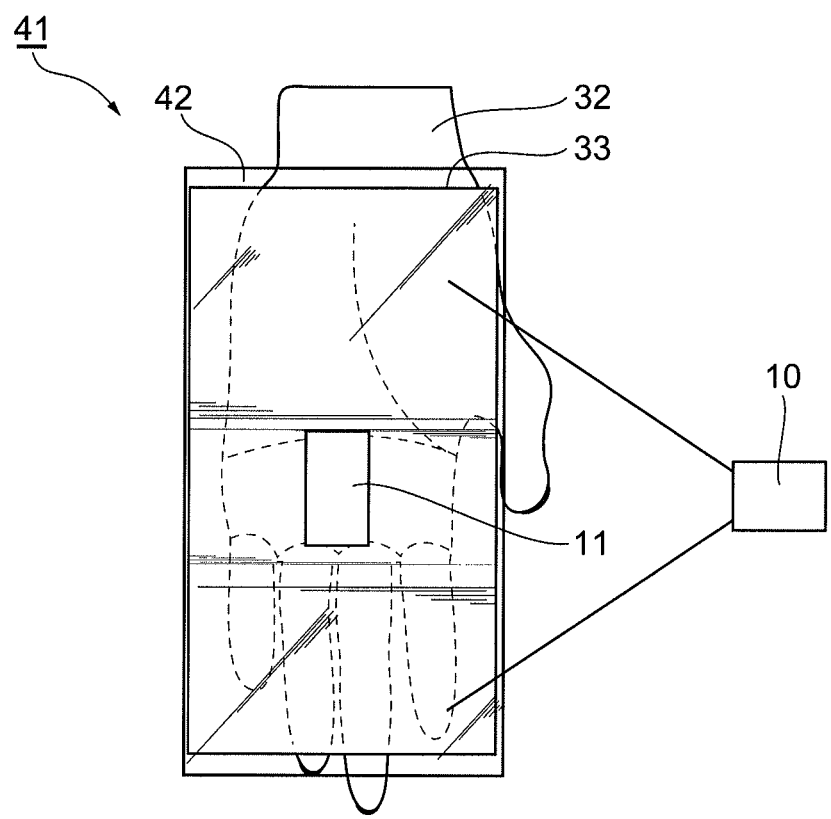
FIG. 19 A schematic bottom view showing the relief pattern detection device of FIG. 18.
Figure 20:
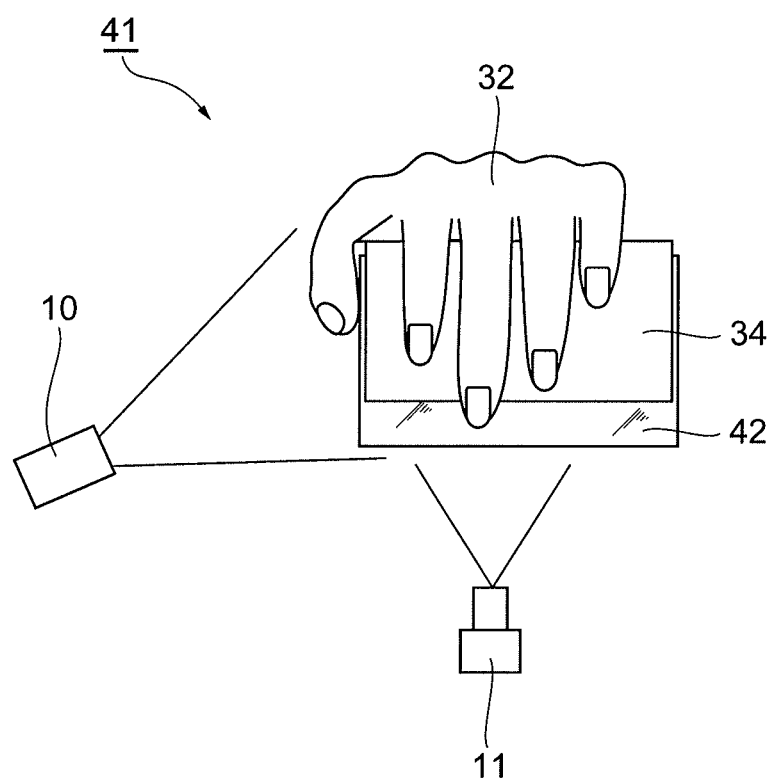
FIG. 20 A schematic front view showing the relief pattern detection device of FIG. 18.

As shown in FIG. 18 to FIG. 20, the relief pattern detection device 41 according to the fourth embodiment includes a thick-plate reinforcing member 42 formed in a wave shape along the output end surface 35 of the slant FOP 33. An upper surface of the reinforcing member 42 is adhered to the output end surface 35 of the slant FOP 33. The reinforcing member 42 is made of an acrylic resin, glass, or the like, and transmits light of the irradiation light source 10 and reflected light reflected on the input end surface 34 and emitted from the output end surface 35.

In the relief pattern detection device 41 according to the fourth embodiment thus configured, the slant FOP 33 can be reinforced by the reinforcing member 42, so that the device durability can be improved. Furthermore, by disposing on the side of the output end surface 35 of the slant FOP 33 the reinforcing member 42 that transmits light of the irradiation light source 10 and reflected light, the influence on the accuracy of fingerprint detection can be suppressed to the minimum. Moreover, an improvement in durability can be realized with a simple structure, which is thus advantageous in reducing the cost of the device.

Fifth Embodiment

A relief pattern detection device 51 according to a fifth embodiment is different from the relief pattern detection device 41 according to the fourth embodiment in only the shape of the reinforcing member.

Figure 21:
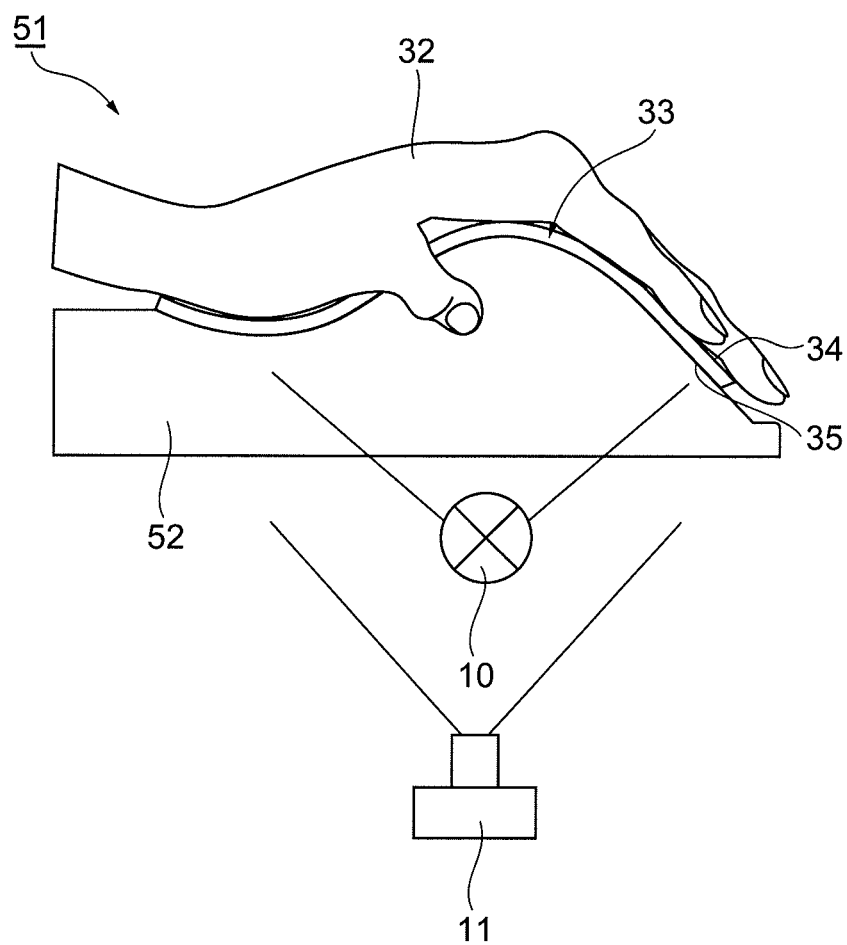
FIG. 21 A schematic side view showing a relief pattern detection device according to a fifth embodiment.
Figure 22:
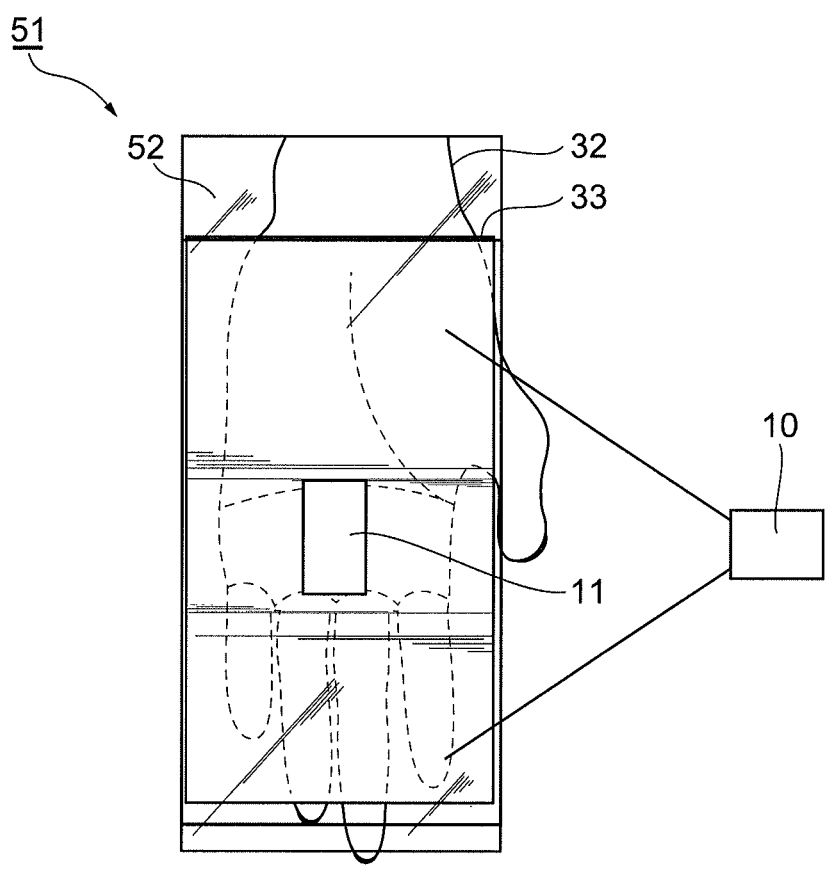
FIG. 22 A schematic bottom view showing the relief pattern detection device of FIG. 21.
Figure 23:
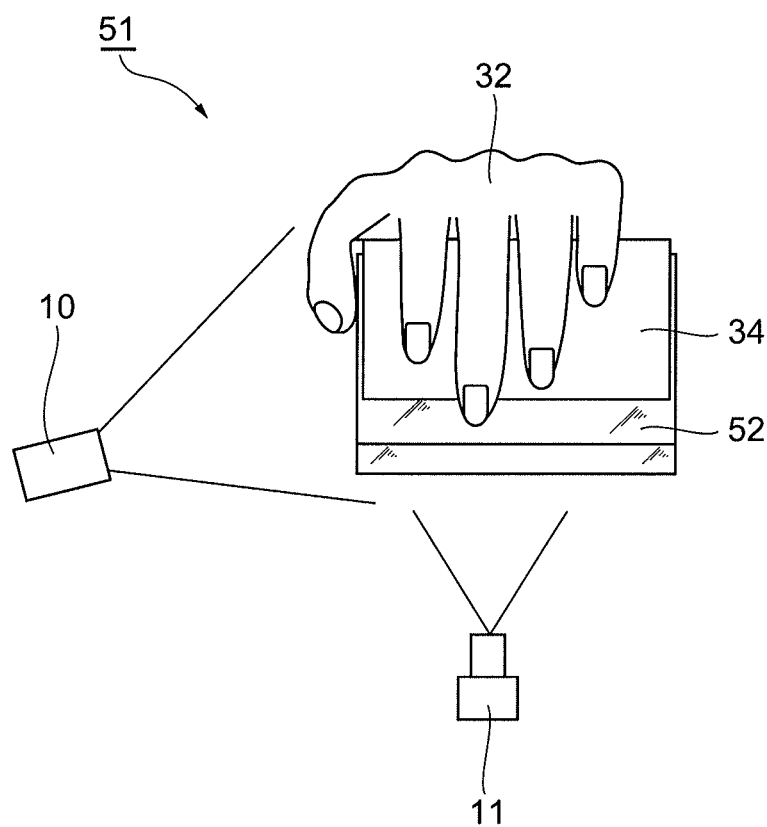
FIG. 23 A schematic front view showing the relief pattern detection device of FIG. 21.

As shown in FIG. 21 to FIG. 23, the relief pattern detection device 51 according to the fifth embodiment includes a mount-shaped reinforcing member 52 on which the tile-shaped slant FOP 33 is mounted. An upper surface of the reinforcing member 52 is formed in a wave shape along the output end surface 35 of the slant FOP 33, and is adhered without a gap to the output end surface 5 of the slant FOP 33. The reinforcing member 52 is made of an acrylic resin, glass, or the like, and transmits light of the irradiation light source 10 and reflected light reflected on the input end surface 34 and emitted from the output end surface 35.

By the relief pattern detection device 41 according to the fifth embodiment thus configured, the same effects as those of the relief pattern detection device 41 according to the fourth embodiment can be obtained. Furthermore, forming the reinforcing member 52 in a mount shape allows an improvement in the assemblability of the reinforcing member 52 and the slant FOP 33 onto another member.

Sixth Embodiment

A relief pattern detection device 61 according to a sixth embodiment is different from the relief pattern detection device 1 according to the first embodiment in being capable of detecting a rotated fingerprint, the shape of the slant FOP, the disposition and number of irradiation light sources, and the disposition of the CCD camera.

Figure 24:
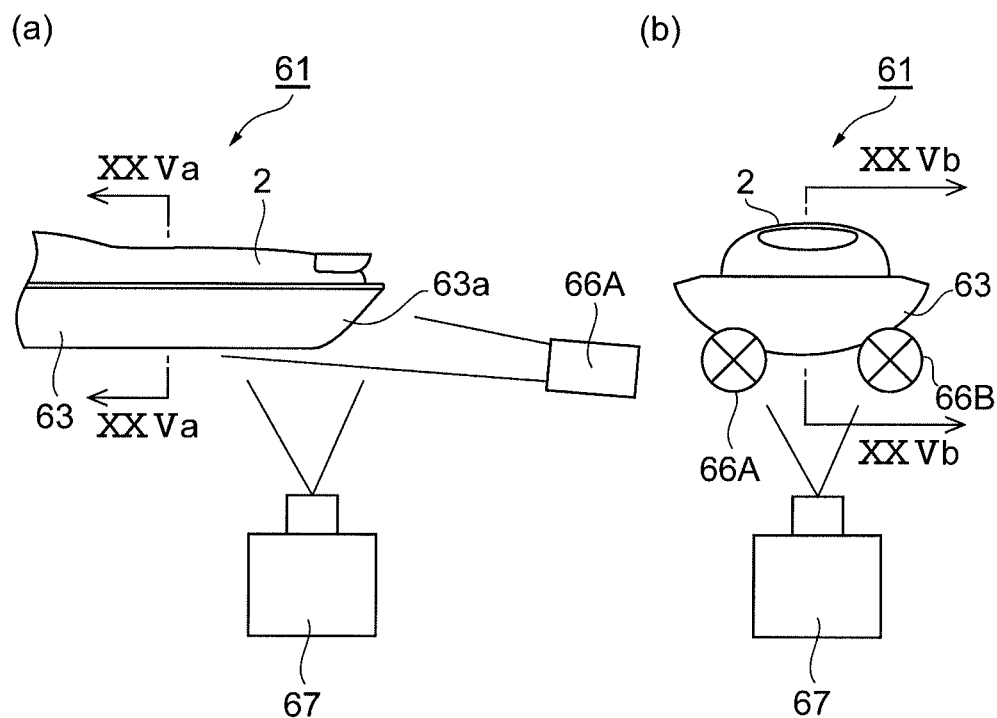
FIG. 24(a) is a schematic side view showing a relief pattern detection device according to a sixth embodiment.
FIG. 24(b) is a schematic front view showing the relief pattern detection device of FIG. 24(a).
Figure 25:
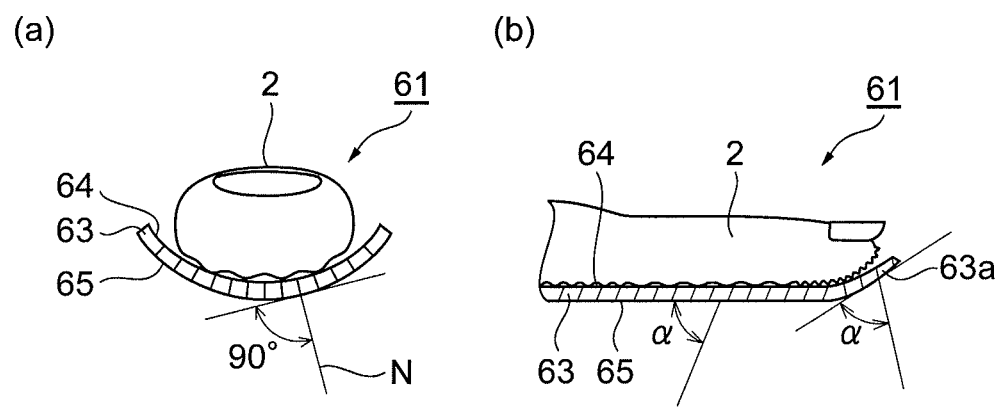
FIG. 25(a) is a sectional view taken along a line XXIVa-XXIVa of FIG. 24(a).
FIG. 25(b) is a sectional view taken along a line XXIVb-XXIVb of FIG. 24(b).

As shown in FIGS. 24 and 25, the relief pattern detection device 61 according to the sixth embodiment is for detecting a rotated fingerprint of a finger 2 of a detection object person, and includes a slant FOP 63 having at its upper surface an input end surface (first surface, second curved surface) 64 with which the finger 2 makes contact.

The slant FOP 63 shows a substantially half-pipe shape. The slant FOP 63 is formed so as to curve up to the left and right from directly under the finger 2. Moreover, a front end portion 63a of the slant FOP 63 is continuous so as to show a U-shape when viewed from above, and a fingertip strikes against its inner surface.

The input end surface 64 of the slant FOP 63, as shown in FIG. 25(a), shows a recessed curved surface when viewed in a direction parallel to a predetermined normal plane (corresponding to the plane of a sheet of FIG. 25(b)) including the optical axis Rf of the optical fiber 6 and substantially perpendicular to an output end surface 35. The input end surface 64 shows a recessed curved surface so as to extend along a lower-side surface of the finger 2. Thus forming the input end surface 64 of the slant FOP 63 makes it easy to bring the lower-side surface of the finger 2 into close contact with the input end surface 64, so that the accuracy of palmprint detection can be improved.

The slant FOP 63 is formed at its lower surface with an output end surface (second surface) 65. The slant FOP 63 has a constant thickness, and the input end surface 64 and the output end surface 65 of the slant FOP 63 are formed so as to have a constant interval therebetween.

As shown in FIG. 25(b), the slant FOP 63 is formed so that the optical axes of optical fibers that form the slant FOP 63 are inclined in a direction in which the fingertip is pointed except at the front end portion 63a. That is, the optical axis inclination direction S of the slant FOP 63 corresponds to a direction in which the fingertip of the finger 2 is pointed except at the front end portion 63a. In addition, at the front end portion 63a, the optical axis inclination direction S takes a direction inclined upward to match the slant FOP 63 that is inclined upward along the fingertip surface. On the other hand, as shown in FIG. 25(a), when the slant FOP 63 is viewed from the fingertip side, the optical axis of the optical fiber is coincident with a normal N of the output end surface 65.

Figure 26:
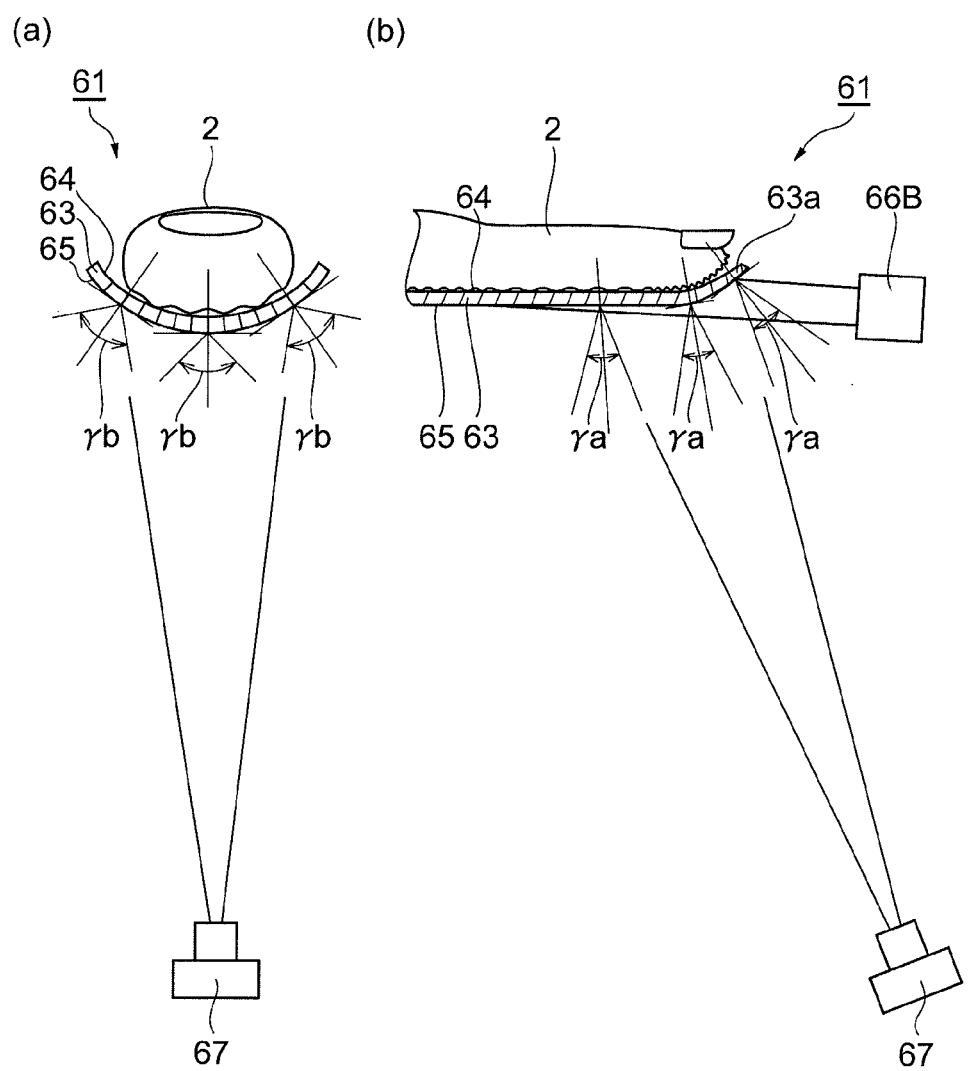
FIG. 26(a) is a sectional view corresponding to FIG. 25(a) for explaining an angular width of an image detectable range.
FIG. 26(b) is a sectional view corresponding to FIG. 25(b) for explaining an angular width of an image detectable range.

As shown in FIGS. 24 and 26, there are disposed obliquely below the slant FOP 63 two irradiation light sources 66A, 66B that irradiate light from the left and right toward the surface of the lower side of the finger 2. The irradiation light sources 66A, 66B are disposed, on the side of the output end surface 65 of the slant FOP 63, side by side in the direction in which the fingertip is pointed. Moreover, the irradiation light sources 66A, 66B are disposed at positions such that irradiated light is made incident into the output end surface 65 in a direction where the irradiated light does not serve as a main object of fiber transmission in the slant FOP 63.

Moreover, there is disposed obliquely below the slant FOP 63 a CCD camera 67 for detecting reflected light emitted from the output end surface 65 of the slant FOP 63. The CCD camera 67 is disposed further below than the irradiation light sources 66A, 66B. The CCD camera 67 is disposed at a position where it can detect a fingerprint image, that is, within an image detectable range. FIG. 26 shows examples of angular widths γa, γb of image detectable ranges.

In the relief pattern detection device 61 thus configured, the same effects as those of the relief pattern detection device 1 according to the first embodiment can be obtained.

Figure 27:
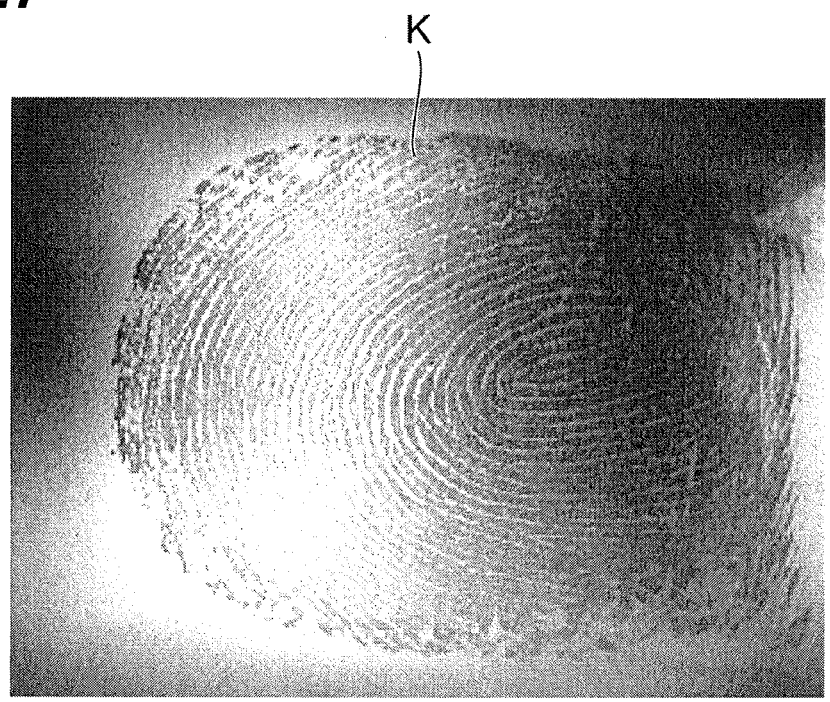
FIG. 27 A view showing a rotated fingerprint detected by the relief pattern detection device of FIG. 24.

Moreover, because the surface of the lower side of the finger 2 including its left and right parts is in close contact with the input end surface 64, a rotated fingerprint can be detected without rotating the finger 2 (refer to FIG. 27). Further, because detection of a rotated fingerprint is realized with a simple configuration, a reduction in the size of the device is easy.

Moreover, image brightness can be uniformized by including the plurality of irradiation light sources 66A, 66B. The number of irradiation light sources is not limited to two, and three or more irradiation light sources may be included, Seventh Embodiment A relief pattern detection device 71 according to a seventh embodiment is different from the relief, pattern detection device 61 according to the sixth embodiment in including a reinforcing member and the numbers of irradiation light sources and CCD cameras.

Figure 28:
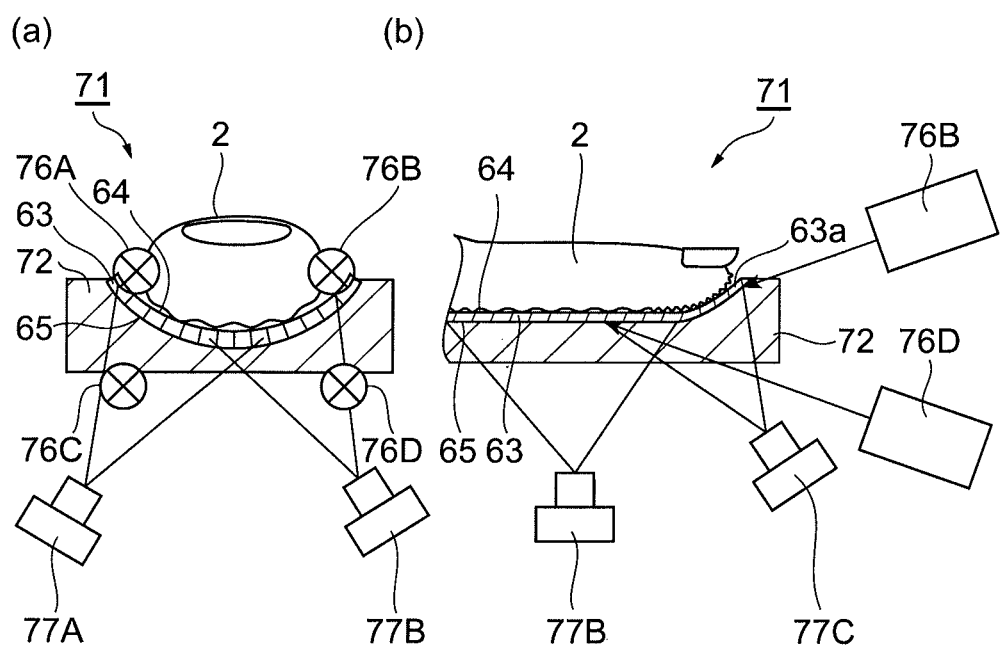
FIG. 28(a) is a sectional view corresponding to FIG. 25(a) showing a relief pattern detection device according to a seventh embodiment.
FIG. 28(b) is a sectional view corresponding to FIG. 25(b) showing the relief pattern detection device of FIG. 28(a).

As shown in FIG. 28, the relief pattern detection device 71 according to the seventh embodiment includes a block-shaped reinforcing member 72 on which a half pipe-shaped slant FOP 63 is mounted. A part of an upper surface of the reinforcing member 72 is depressed in the form of the output end surface 65 of the slant FOP 63, and the slant FOP 63 is fitted in the depression while the output end surface 65 of the slant FOP 63 and the upper surface of the reinforcing member 72 are adhered to each other without a gap. The reinforcing member 72 is made of an acrylic resin, glass, or the like, and transmits light of the irradiation light sources 76A to 76D and reflected light reflected on the input end surface 64 and emitted from the output end surface 65.

The irradiation light sources 76A to 76D are disposed, on the side of the output end surface 65 of the slant FOP 63 (outside the reinforcing member 72), in the direction in which the fingertip of the finger 2 is pointed. The irradiation light sources 76A, 76B are disposed obliquely above the slant FOP 63, and irradiate light from the left and right toward the lower side of the fingertip of the finger 2 through the front end portion 63a of the slant FOP 63 that is inclined upward. The irradiation light sources 76C, 76D are disposed obliquely below the slant FOP 63, and irradiate light from the left and right toward the lower side of a cushion of the finger 2 through the slant FOP 63.

On the lower side of the slant FOP 63, two CCD cameras 77A, 77B for detecting cushion images of the finger 2 from the left and right are disposed. Moreover, on the lower side in the direction in which the fingertip is pointed when viewed from the slant FOP 63, a CCD camera 77C for detecting a fingertip image of the finger 2 is disposed. Next to the CCD camera 77C, a CCD camera (not shown) to be paired with the CCD camera 77C is disposed. These CCD cameras detect fingertip images of the finger 2 from the left and right.

In the relief pattern detection device 71 thus configured, the slant FOP 63 can be reinforced by the reinforcing member 72, so that the device durability can be improved. Furthermore, by disposing on the side of the output end surface 65 of the slant FOP 63 the reinforcing member 72 that transmits light of the irradiation light sources 76A, 76B and reflected light, the influence on the accuracy of fingerprint detection can be suppressed to the minimum. Moreover, an improvement in durability can be realized with a simple structure, which is thus advantageous in reducing the cost of the device.

Moreover, image detection of a rotated fingerprint without dead angles is realized by including a plurality of CCD cameras and combining images detected by the respective cameras.

Eighth Embodiment

A relief pattern detection device 81 according to an eighth embodiment is different from the relief pattern detection device 71 according to the seventh embodiment in only the shape of the reinforcing member.

Figure 29:
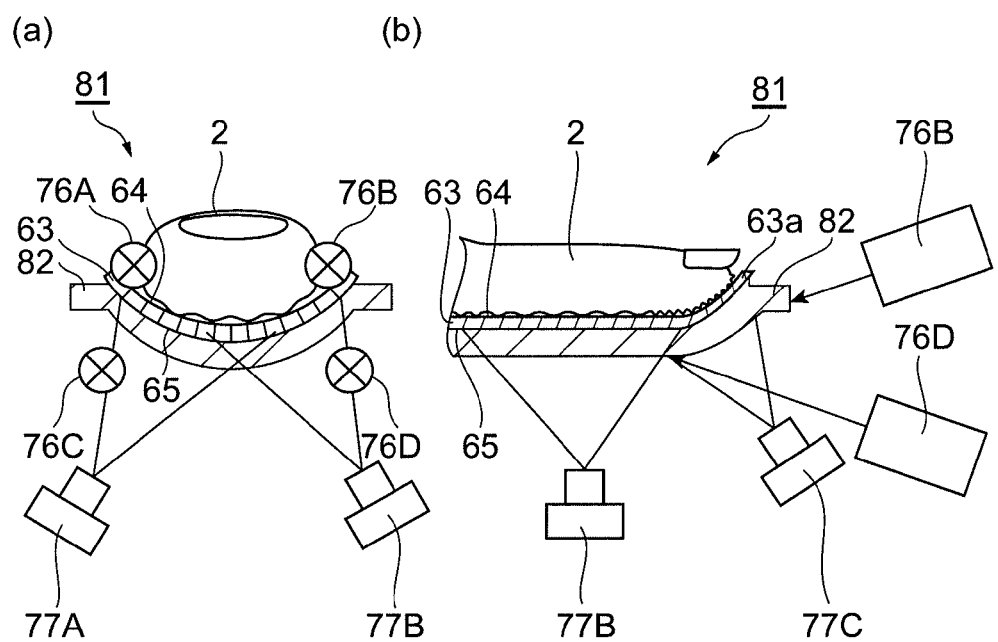
FIG. 29(a) is a sectional view corresponding to FIG. 24(a) showing a relief pattern detection device according to an eighth embodiment.
FIG. 29(b) is a sectional view corresponding to FIG. 24(b) showing the relief pattern detection device of FIG. 29(a).

As shown in FIG. 29, the relief pattern detection device 81 according to the eighth embodiment includes a thick-plate reinforcing member 82 having at its upper surface a recess extending along the output end surface 65 of the slant FOP 63. The recess of the upper surface of the reinforcing member 82 and the output end surface 65 of the slant FOP 63 are adhered to each other without a gap. The reinforcing member 82 is made of an acrylic resin, glass, or the like, and transmits light of the irradiation light sources 76A to 76D and reflected light reflected on the input end surface 64 and emitted from the output end surface 65.

By the relief pattern detection device 81 according to the eighth embodiment thus configured, the same effects as those of the relief pattern detection device 71 according to the seventh embodiment can be obtained. Furthermore, the reinforcing member 82 is foamed in a thick plate shape, which is thus advantageous in reducing the thickness of the device.

The present invention is not limited to the embodiments described above.

For example, the relief pattern detection device according to the present invention can be suitably used also for detection of a relief pattern on the surface of a soft object such as a rubber stamp, besides detection of a fingerprint and a palmprint.

Moreover, the shape of the slant FOP 3 is not limited to the shapes described above, and even a slant FOP for palmprint detection may be formed in a flat plate shape. Moreover, the disposition of the irradiation light source and CCD camera is appropriately set according to the shape and the like of the slant FOP 3. In addition, there may be a mode for detecting a relief pattern image by use of an appropriate imaging device or the like, besides a CCD camera.

Moreover, the reinforcing member is not limited to ones in a thick plate shape, a mount shape, or a block shape, and variously shaped members may be used. For example, the reinforcing member may be provided in a shape that allows usage of the reinforcing member as a connection member with another component.

INDUSTRIAL APPLICABILITY

According to the present invention, when detecting a relief pattern on the surface of an object, an image with sufficient contrast can be detected, so that the reliability of relief pattern detection can be improved.

REFERENCE SIGNS LIST

1, 21, 31, 41, 51, 61, 71, 81—relief pattern detection device, 2—finger (object), 3, 33, 63—slant FOP, 4, 34—input end surface (first surface), 5, 35, 65—output end surface (second surface), 6—optical fiber, 10, 66A, 66B, 77A~77D—irradiation light source (irradiating means), 11, 67, 77A~77C—CCD camera (relief pattern detecting means), 22, 42, 52, 72, 82—reinforcing member, 32—hand (object), 34—upper surface (first curved surface) of front portion, 64—input end surface (first surface, second curved surface).

The invention claimed is:

1. A relief pattern detection device for detecting a relief pattern on an object surface, comprising:
   a fiber optic plate having a first surface which is formed of first end faces of a plurality of optical fibers and with which the object surface is brought into contact and a second surface which is formed of second end faces of the optical fibers and is substantially parallel to the first surface;
   irradiation light source disposed on the second surface side of the fiber optic plate, for irradiating the second surface with light; and
   relief pattern detector disposed on the second surface side of the fiber optic plate, for detecting the relief pattern based on light emitted from the second surface, wherein
   the fiber optic plate includes the optical fibers and an absorber for absorbing light, disposed between the optical fibers,
   optical axes of the optical fibers are inclined so as to create a first angle less than 90° in one direction from a second surface within a predetermined plane substantially perpendicular to the second surface,
   the irradiation light source irradiates the second surface with light in a direction to create a second angle less than 90° in the other direction from the second surface within the predetermined plane, and
   the first angle and the second angle are set so that light made incident from the second surface into a core of the optical fiber enters into a cladding of the optical fiber, and
   the first angle is an angle within a range of 63° to 73° and the second angle is an angle within 5° to 30°.

2. The relief pattern detection device according to claim 1, wherein on the second surface of the fiber optic plate, a reinforcing member that transmits the light is provided.

3. The relief pattern detection device according to claim 1, wherein the first surface of the fiber optic plate has a first curved surface to show a projecting shape when viewed in a direction substantially parallel to the predetermined plane.

4. The relief pattern detection device according to claim 1, wherein the first surface of the fiber optic plate has a second curved surface to show a recessed shape when viewed in a direction substantially parallel to the predetermined plane.

* * * * *